United States Patent [19]

Sato

[11] 4,288,827
[45] Sep. 8, 1981

[54] AUTOMATIC SWITCHING DEVICE FOR CASSETTE TAPE RECORDER WITH LOW FREQUENCY COMPENSATING MEANS

[75] Inventor: Masaaki Sato, Hachioji, Japan

[73] Assignee: Olympus Optical Company Ltd., Japan

[21] Appl. No.: 28,095

[22] Filed: Apr. 9, 1979

Related U.S. Application Data

[60] Division of Ser. No. 841,758, Oct. 13, 1977, Pat. No. 4,158,865, which is a continuation of Ser. No. 645,458, Dec. 30, 1975, abandoned.

[30] Foreign Application Priority Data

| Jan. 24, 1975 | [JP] | Japan | 50-11244[U] |
| Jan. 24, 1975 | [JP] | Japan | 50-11245[U] |
| Jan. 31, 1975 | [JP] | Japan | 50-13564 |
| Jan. 31, 1975 | [JP] | Japan | 50-15146[U] |
| Feb. 19, 1975 | [JP] | Japan | 50-23005[U] |
| Feb. 20, 1975 | [JP] | Japan | 50-21648 |

[51] Int. Cl.² .............. G11B 15/06; G11B 15/49
[52] U.S. Cl. .................. 360/137; 360/66; 360/73
[58] Field of Search ............ 360/65, 66, 137, 73, 360/74.1, 74.5, 132, 25, 69

[56] References Cited

U.S. PATENT DOCUMENTS

| 3,439,127 | 4/1969 | Weisel | 360/65 |
| 3,588,380 | 6/1971 | Horlander | 360/66 |
| 3,602,650 | 8/1971 | Bah | 360/73 |
| 3,677,556 | 7/1972 | Oosone | 360/132 |
| 3,684,298 | 8/1972 | Ban | 360/73 |
| 3,718,774 | 2/1973 | Kosaka | 360/60 |
| 3,766,327 | 10/1973 | Johnson et al. | 360/96 |
| 3,785,658 | 1/1974 | Ikeda | 360/60 |
| 3,864,738 | 2/1975 | Syohji | 360/66 |
| 3,938,195 | 2/1976 | Fukayama | 360/73 |
| 4,053,935 | 10/1977 | Shiba | 360/66 |

OTHER PUBLICATIONS

Uhrer ad in Stereo Review, vol. 35, No. 4, Oct. 1975, p. 120.

Primary Examiner—Jay P. Lucas
Attorney, Agent, or Firm—Ostrolenk, Faber, Gerb & Soffen

[57] ABSTRACT

An automatic switching device for a cassette tape recorder is provided which includes a detecting member disposed within the tape recorder for cooperation with at least one detection opening provided in a tape cassette so as to indicate the variety of a magnetic tape internally housed therein, thereby establishing an optimum bias and/or an optimum tape speed for the tape recorder, a compensation circuit compensates for low frequency signals recorded on the tape when the detecting member determines that such compensation is desirable.

13 Claims, 48 Drawing Figures

F I G. 43
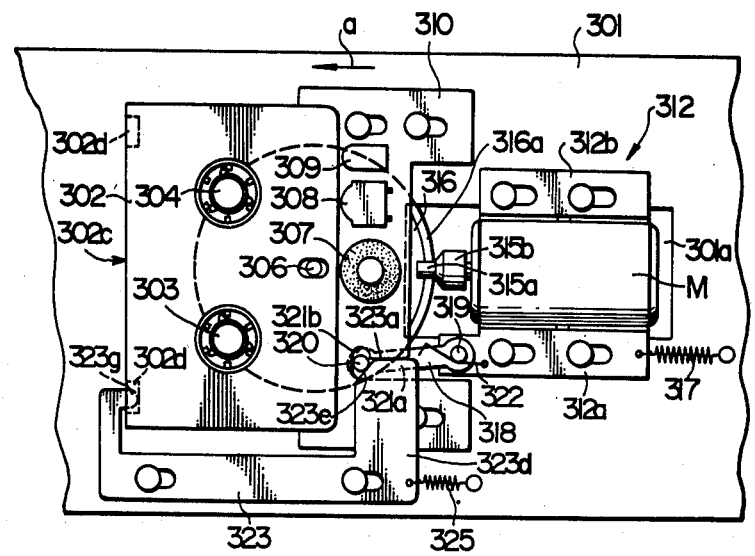
F I G. 44
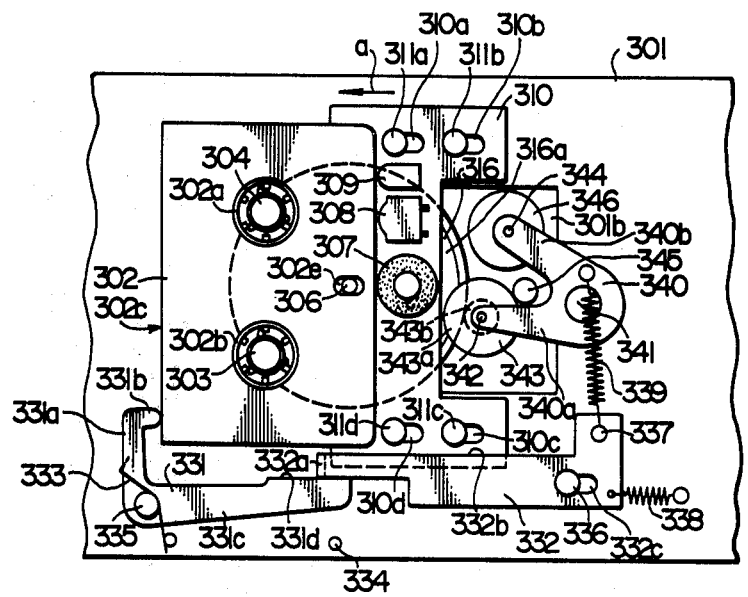

AUTOMATIC SWITCHING DEVICE FOR CASSETTE TAPE RECORDER WITH LOW FREQUENCY COMPENSATING MEANS

RELATED APPLICATIONS

The present application is a division of application Ser. No. 841,758, filed Oct. 13, 1979, now U.S. Pat. No. 4,158,865, which is a continuation of application Ser. No. 645,458, filed Dec. 30, 1975, now abandoned.

BACKGROUND OF THE INVENTION

The invention relates to an automatic switching device for a cassette tape recorder which enables a number of cassette tapes of different varieties to be played under their particular optimum conditions.

A tape recorder is known which is capable of detecting a lug provided on the part of a tape cassette for preventing an inadvertent erasure of a recorded tape when the removal of the lug is detected. A tape recorder is also known which selectively provides an optimum bias applied to a magnetic head cooperating with the tape as the variety of the magnetic tape is changed. Known tape recorders also include means for changing the tape running speed as the variety of the tape is changed. However, known tape recorders incorporate only one of these features alone, and while the construction associated with the individual features is simple, a combination of all of these features will require an increase in space and a more complex construction when incorporated into a single tape recorder. Cassette tape recorders have been manufactured in an increasingly smaller size, and it will be prohibitive to incorporate all of the above features in a miniature tape recorder, which has been recently developed by the present applicant, in view of the space requirement and the manipulating capability. Wrong operation may cause a damage to the recorder and the tape cassette. Thus, it is evident that there is a need in the art for some means which overcome such difficulties.

SUMMARY OF THE INVENTION

The invention overcomes the above difficulties by providing an automatic switching device for a cassette tape recorder which is simple in construction and which permits magnetic tapes of a variety of magnetizable materials to be played with an optimum bias to the tape and at the optimum tape speed, by an automatic switching function which is achieved by a detecting member provided on the part of the tape recorder for cooperation with at least one detection opening formed in each of the magnetic tape cassettes.

Therefore, it is an object of the invention to provide an automatic switching device for a cassette tape recorder having the ability to switch a bias applied to a magnetic head automatically in response to an operation of a detecting member which cooperates with a pair of detecting openings provided on the part of a tape cassette and indicative of the variety of the magnetizable material of the tape contained therein and a desired tape running speed.

It is another object of the invention to provide an automatic switching device for a cassette tape recorder which includes a tape speed switching member which is disengaged from a tape cassette when the recorder is inoperative, but which is moved into a position in which it is capable of engaging a tape speed detecting opening formed in the tape cassette as a record/playback operating member is actuated when a record or playback operation is desired, thus avoiding an interference of the switching member with the tape cassette whatever the manner in which the cassette is loaded.

It is a further object of the invention to provide an automatic switching device for a cassette tape recorder which utilizes an externally driven member such as a record/playback button to permit a switch having a high contact pressure to be operated with facility to provide a reliable switching action and to permit a switch in a tone compensation circuit to also be operated simultaneously as the tape speed is changed.

BRIEF DESCRIPTION OF THE DRAWINGS

FIGS. 42 and 43 are similar to FIG. 40 and illustrating the operation of the apparatus shown in FIG. 40;

FIG. 44 is a plan view of still another embodiment of the automatic switching device according to the invention;

DETAILED DESCRIPTION OF EMBODIMENTS

In the early stage of the development of tape recorders, the magnetic tape used has been formed of a magnetizable material such as γ-hematite or magnetite. Recently, a magnetic tape having high coercive force is available which contains chromium oxide or cobalt. These latter tapes exhibit a high coercive force, affording a high sensitivity in the high frequency region. However, when a tape having a high coercive force is used, the bias applied to the tape head must be increased over the bias applied when using tapes formed of γ-hematite, and where both kinds of these tapes are used with the same amplifier, there is a need to provide a low frequency compensation for an output from the high coercivity tape since otherwise the sound reproduced from such tape will produce a shrilling effect when the same tape speed of, for example, 2.4 cm/sec is used. If the high coercivity tape is run at a speed which is one-half that used with the γ-hematite tape, there can be produced a tone effect similar to that obtained with γ-hematite tape. This clearly indicates the necessity to switch the tape speed as well as the bias circuit to accomodate any one of the variety of magnetic tapes which may be used in the recorder.

The invention provides an automatic switching device for a cassette tape recorder which provides an optimum tape speed and an optimum tone compensation by detecting which one of the variety of magnetizable materials of a magnetic tape is contained in a tape cassette, through the detection of a detection opening or openings formed in the individual cassettes.

At this end, a tape cassette used in the present invention is provided with a pair of detection openings. By way of example, the presence of one of the detection openings indicates a high coercivity tape, while the absence of such opening indicates a γ-hematite tape. The presence of the other detection opening indicates a tape speed of 1.2 cm/sec while the absence of such opening indicates a tape speed of 2.4 cm/sec. Thus it will be seen that the presence of the both detection openings indicates that the tape used is of a high coercivity type and that the tape should be run at a speed of 1.2 cm/sec. When the same tape is to be run at a speed of 2.4 cm/sec, the detection opening indicative of the tape variety will be present while the speed indicating opening will be absent. Finally, no such opening will be present in a tape cassette which contains a hematite tape. Thus, when the tape used is of a high coercivity type and is to be run at a tape speed of 2.4 cm/sec, low frequency compensation must be provided, which is activated in accordance with the invention by detecting the combination of the detection openings, one present and the other absent. Such detection is utilized to automatically switch the operation of the tape recorder.

Figure 1:
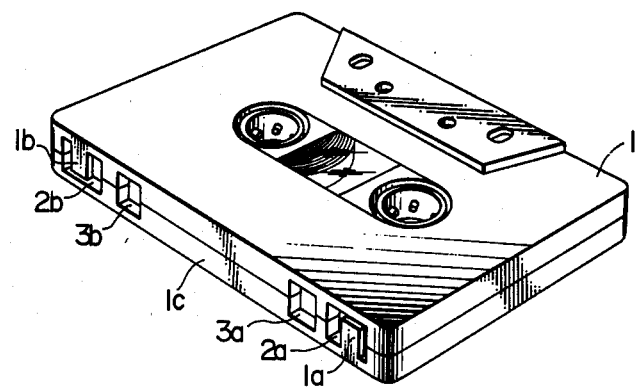
FIG. 1 is a perspective view of a compact cassette constructed in accordance with the invention.

Referring to FIG. 1, there is shown a perspective view of a compact tape cassette 1 which is constructed in accordance with the invention. Except for the features to be described later, the cassette is conventional in that a pair of lugs 1a, 1b are formed in the rear end face 1c thereof for preventing an inadvertent erasure of a recorded tape. As shown, these lugs are formed in respective recesses in the rear end face 1c so that they can be broken off or folded whenever a recording previously made on an internally housed magnetic tape is to be preserved. As is well recognized, when these lugs are removed from the cassette 1, cooperating members detect such removal to prevent a recording operation of the cassette tape recorder, thus preventing an inadvertent erasure of a recorded tape. In accordance with the invention, these recesses are extended lengthwise of the end face 1c to form a pair of detection openings 2a, 2b so as to indicate the variety of the magnetic tape contained in the cassette. Thus, the presence of these detection openings 2a, 2b indicate that the cassette internally houses a magnetic tape of a high coercivity type. Adjacent to the detection openings 2a, 2b, the end face 1c is also formed with a pair of detection openings 3a, 3b which are intended to indicate the desirable tape speed. The detection openings 3a, 3b are formed only in those tape cassettes housing a tape which is to be run at a tape speed of 1.2 cm/sec. The cassette 1 shown in FIG. 1 is provided with all of the detection openings 2a, 2b and 3a, 3b, and hence indicates that the tape housed therein is of a high coercivity type and is to be run at a tape speed of 1.2 cm/sec.

Figure 2:
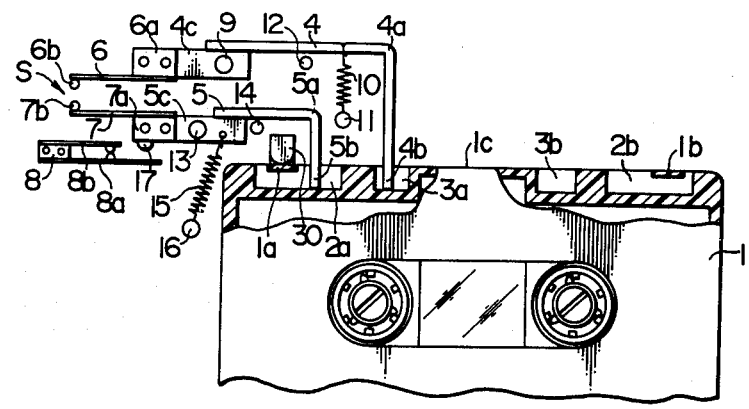
FIG. 2 is a plan view, partly in section, of a detection mechanism for cooperating with a detection opening, constructed in accordance with one embodiment of the invention.

Referring to FIG. 2, a detection mechanism for detecting the presence or absence of these detection openings is shown as comprising a tape speed detection member 4, a tape material detection member 5, a pair of movable blades 6, 7 which constitute together a switch, and a bias changing switch 8. The tape speed detecting member 4 is in the form of a lever which is pivotally mounted on a pivot 9 at a position spaced rearwardly of the cassette 1 as it is loaded into the tape recorder. The detecting member 4 has an arm portion 4a which extends generally parallel to the rear end face 1c of the cassette 1, and a detecting piece 4b is folded at right angles thereto to extend into any detection opening 3a formed in the end face 1c and which is indicative of a desirable tape speed. The detecting member 4 also includes an extension 4c which extends in the opposite direction from the arm portion 4a, and the conductive movable blade 6 has its contact seat 6a secured to the free end of the extension 4c with an insulating material interposed therebetween. At its other end, the movable blade 6 fixedly carries an electrical contact 6b thereon. A coiled tension spring 10 extends between the arm portion 4a and a stationary pin 11 to urge the detecting lever 4 to rock clockwise about the pivot 9, but the resulting movement of the detecting member 4 is normally limited by abutment of the arm portion 4a against a stop pin 12.

The tape material detecting member 5 is disposed intermediate the detecting member 4 and the cassette 1 when loaded, and is in the form of a lever which is pivotally mounted on a pivot 13. The detecting member 5 includes an arm portion 5a which extends generally parallel to the end face 1c of the cassette 1, and a detecting piece 5b is formed by folding at right angles to the length of the arm portion 5a so as to extend into any detection opening 2a formed in the end face 1c and which is indicative of a tape material. The detecting member 5 also includes an extension 5c which extends in the opposite direction from the arm portion 5a, and the conductive movable blade 7 has its contact seat 7a secured to the free end of the extension 5c with an insulating material interposed therebetween. At its other end, the movable blade 7 fixedly carries an electrical contact 7b which is located opposite to the electrical contact 6b on the movable blade 6. A coiled tension spring 15 extends between the arm portion 5c and stationary pin 16 to rock the detecting member 5 clockwise about the pivot 13, but the resulting movement is normally limited by the abutment of the arm portion 5a against a stop pin 14.

The bias changing switch 8 is a normally closed switch formed by a pair of movable and stationay blades 8a, 8b which are located below the movable blade 7, as viewed in FIG. 2. The movable blade 8a extends close to the contact seat 7a, and is moved by a projection 17 to open the switch 8 as the detecting member 5 is rocked counter-clockwise about the pivot 13, the projection 17 being integrally formed with the insulating member which electrically insulates the contact seat 7a from the arm portion 5c.

Figure 7:
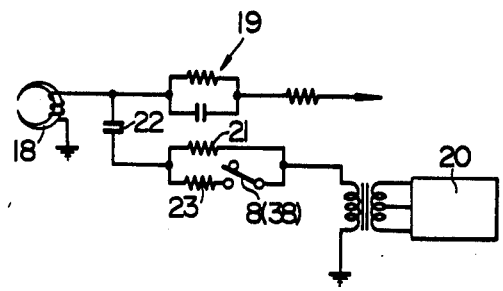
FIG. 7 is a circuit diagram of one example of a recording bias current switching circuit.

The normally closed, bias changing switch 8 is connected in a bias circuit of the tape recorder, as shown in FIG. 7. In this Figure, a record/playback head 18 is shown as being connected through a record equalizer circuit 19 so as to receive or deliver a signal to be recorded or a signal to be reproduced from the magnetic tape. An output from an oscillator 20 is applied as a bias current to the head 18 through a resistor 21 and a capacitor 22 connected in series when the switch 8 is open. The switch 8 is connected in series with a resistor 23 across the resistor 21. When the switch 8 is closed, the composite resistance presented by the resistors 21, 23 is reduced, thus applying an increased bias current to the head 18. The movable blades 6, 7 form a switch S which is connected in an equalizer circuit shown in FIG. 8 which provides a low frequency compensation. As shown, the equalizer circuit comprises a pair of resistors 24, 25 and a pair of capacitors 26, 27, and may be connected through the switch S between a pair of amplifying transistors 28, 29.

In FIG. 2, numeral 30 represents a lug detecting member which detects the presence or absence of a lug 1a which is provided on the part of the cassette 1 for preventing an inadvertent erasure of a recorded tape.

The operation of the detection mechanism will be described below. Since the cassette shown in FIGS. 1 and 2 internally houses a magnetic tape of a high coercivity type and which is to be run at a tape speed of 1.2 cm/sec, the rear end face 1c thereof is provided with both of the detection openings 2a, 3a. As a result, when the cassette 1 is loaded on the tape recorder, the detecting piece 5a of the detecting member 5 extends into the detection opening 2a while rotating clockwise about the pivot 13 under the resilience of the spring 15. This results in a movement of the projection 17 away from the movable blade 8a, whereby the bias changing switch 8 is closed to increase the bias current applied to the head 18 (see FIG. 7).

Figure 8:
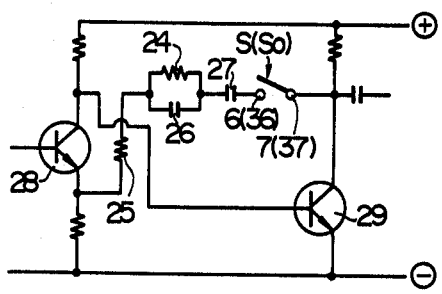
FIG. 8 is a circuit diagram of one example of a low frequency compensation circuit.

Simultaneously, the detecting piece 4b of the detecting member 4 extends into the detection opening 3a while rotating clockwise about the pivot 9 under the resilience of the spring 10, whereby the movable blade 6 is moved away from the other movable blade 7, opening the switch S. As a result, the low frequency compensation circuit shown in FIG. 8 is disconnected from the amplifier circuit. The rocking motion of the detecting member 4 is utilized to change the tape speed to 1.2 cm/sec by a suitable mechanism which is conventional and therefore will not be described specifically.

Figure 3:
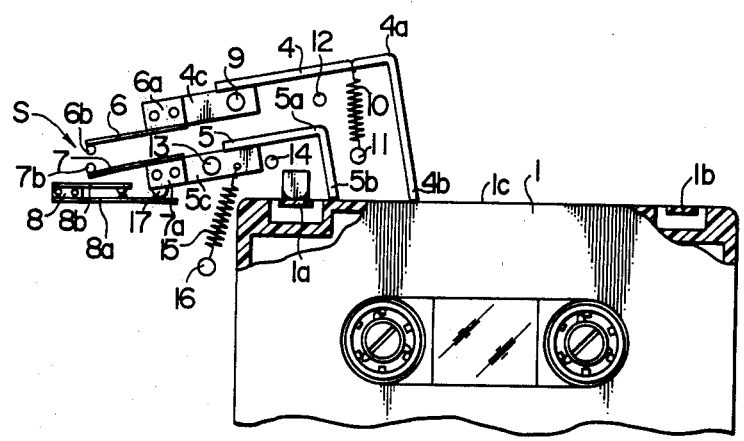
FIGS. 3 to 5 are similar views to FIG. 2, illustrating the operation of the detection mechanism.

FIG. 3 shows a tape cassette internally housing a γ-hematite tape which is to be run at a tape speed of 2.4 cm/sec. Thus, no detection openings 2, 3 are formed in the rear end face of the cassette 1. As a result, when the cassette is loaded, the both detecting members 5, 4 are moved by the end face 1c of the cassette so as to rock counter-clockwise about the respective pivots 13, 9 against the bias applied by the springs 15, 10. As the detecting member 5 rocks in this manner, the projection 14 thereon opens the switch 8, whereby the bias current applied to the head 18 is reduced. Also the movable blade 7 is moved away from the movable blade 6 to open the switch S, which therefore disconnects the low frequency compensation circuit (see FIG. 8) from the amplifier circuit. As a consequence, the tape is run at a rate of 2.4 cm/sec, and a usual bias is applied to the magnetic head 18.

Figure 4:
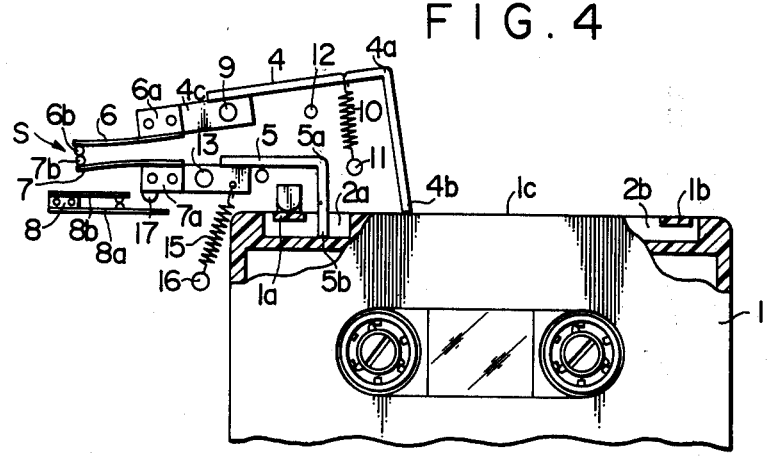

An arrangement is shown in FIG. 4 which occurs when the cassette internally housing a tape of a high coercivity type, but which is to be run at a tape speed of 2.4 cm/sec, is loaded. In this instance, the rear end face 1c of the cassette 1 is formed with the tape material detection openings 2a, 2b. Hence, when the cassette 1 is loaded, the detecting piece 5b of the detecting member 5 extends into the detection opening 2a while rotating clockwise about the pivot 13 under the resilience of the spring 15. However, the absence of the detection opening 3a causes the detecting member 4 to be moved by the rear end face 1c to rock counter-clockwise about the pivot 9 against the resilience of the spring 10. As the detecting member 4 rocks counter-clockwise while the detecting member 5 rocks clockwise, the electrical contact 6b on the movable blade 6 and the electrical contact 7b on the movable blade 7 are brought into electrical contact with each other, thus closing the switch S. The closure of the switch S connects the low frequency compensation circuit shown in FIG. 8 intermediate the amplifying transistors 28, 29. As the detecting member 5 rocks clockwise, the projection 17 thereon is moved away from the movable blade 8a, whereby the bias changing switch 8 remains closed, thus increasing the bias applied to the magnetic head. The tape speed is not switched to a lower speed, but the tape is driven at the usual rate of 2.4 cm/sec.

Figure 5:
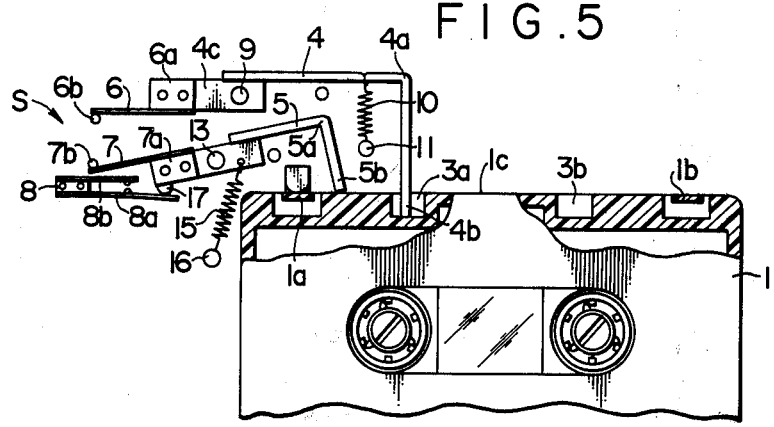

FIG. 5 shows an arrangement for a tape cassette which internally houses a γ-hematite tape, which should be run at a tape speed of 1.2 cm/sec. In this instance, the cassette is only formed with the detection openings 3a, 3b which are utilized for changing the tape speed. The detecting piece 4b detects the presence of the detection opening 3a by rocking clockwise about the pivot 9 under the resilience of the spring 10, while the detecting member 5 is urged to rock counter-clockwise about the pivot 13 as a result of the absence of its associated detection opening. As a result of these rocking motions, the movable blades 6, 7 move away from each other to open the switch S to thereby disable the low frequency compensation and to open the bias changing switch S by means of the projection 17, thereby reducing the bias current applied to the magnetic head. It will be evident from FIG. 5 that in the position shown, the arm portion 4a of the tape speed detecting member 4 is most closely spaced from the arm portion 5a of the tape material detecting member 5, so that suitable electrical contacts may be provided on the respective arm portions to close a switch formed therebetween to increase the high frequency compensation during a record mode, for example, as these arm portions approach each other.

Figure 6:
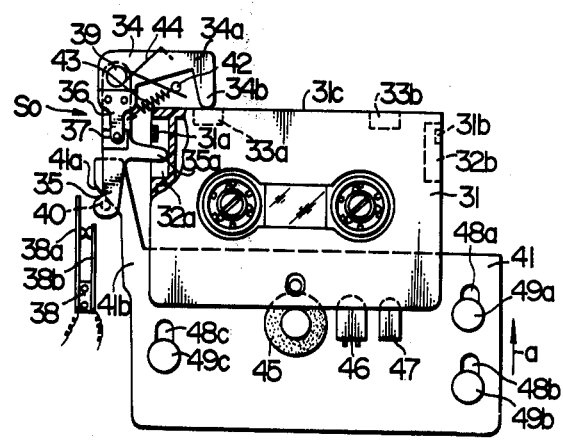
FIG. 6 is a plan view of a micro-cassette constructed in accordance with the invention and of one embodiment of a detection mechanism which cooperates with a detection opening formed therein.

FIG. 6 shows an example of a micro-cassette which has been recently developed by the present applicant and to which the present invention is applicable. Specifically, there is shown a micro-cassette 31 which is provided with a pair of lugs 31a, 31b in corresponding recesses in both lateral edge faces of the cassette toward its rear end face 31c. The purpose of these lugs is to prevent an inadvertent erasure of a recorded magnetic tape which is internally housed within the cassette. The recesses in which the lugs 31a, 31b are formed are enlarged in accordance with the invention to provide a pair of magnetic material detection openings 32a, 32b. The cassette 31 shown in FIG. 6 internally houses a magnetic tape of a high coercivity type which is to be driven at a tape speed of 2.4 cm/sec, and hence is not provided with detection openings associated with indicating the desirable tape speed. However, if it is desired to provide these openings, they may be formed in the rear end face 31c as shown at 33a, 33b by broken lines, at a position inward from their respective lateral edges.

The detection mechanism which detects the presence or absence of these detection openings is shown as comprising a tape speed detecting member 34 in the form of an inverted L-shaped lever, a magnetic material detecting member 35, a pair of blades 36, 37 which constitute together a switch, and a bias changing switch 38. Specifically, the detecting member 35 is pivotally mounted on a pivot 39, and extends generally parallel to the lateral side in which the lug 31a is disposed. Intermediate its length, the detecting member 35 has an integral arm which extends therefrom in a direction toward the detection opening 32a, and the free end of the arm forms a detecting piece 35a. A conductive contact 37 is applied to the upper surface of the detecting member 35 intermediate its length, with an insulating material interposed between the contact 37 and the detecting member 35. The free end of the detecting member carries a downwardly depending pin 40, which is adapted to be moved by a bevelled or cam edge 41a of an operating plate 41 to be described later, thus causing the member 35 to rock clockwise about the pivot 39. A coiled tension spring 43 extends between the member 35 and a stop pin 42 to urge the member to rock counter-clockwise about the pivot 39. However, the resulting rocking motion is normally limited by the abutment of the depending pin 40 against the bevelled edge 41a.

The tape speed detecting member 34 is pivotally mounted on the same pivot 39 as the detecting member 35, and has an arm portion 34a extending parallel to the rear end face 31c of the cassette. The free arm portion 34a extends in a direction toward the detection opening 33a, with its free end forming a detecting piece 34b. The detecting member 34 has another arm portion of a short length which extends in overlapping relationship with the detecting member 35 and which has a conductive contact 36 secured thereto with an insulating material interposed therebetween. The contact 36 is elongate and has its free end extending to overlie the contact 37 so as to be engageable and disengageable therewith. The contacts 36, 37 constitute together a switch $S_0$ which is similar to the low frequency compensation switch S shown in the embodiment of FIGS. 2 to 5. A torsion spring 44 disposed on the pivot 39 has its one end engaged with the arm portion 34a and its other end engaged with a stop pin 42, thus urging the detecting member 34 to rock clockwise about the pivot 39. However, such rocking motion is normally limited by the abutment of the arm portion 34a against the stop pin 42.

The bias changing switch 38 is a normally closed switch formed by a pair of movable and stationary blades 38a and 38b. The free end of the movable blade 38a extends into the path of rocking movement of the free end of the detecting member 35. The switch 38 provides a switching function illustrated in FIG. 7 while the switch $S_0$ functions to connect or disconnect the low frequency compensation circuit shown in FIG. 8. These switching actions take place in a manner similar to the embodiment shown in FIGS. 2 to 5, and therefore will not be described in detail.

The operating plate 41 fixedly carries thereon a pinch roller 45, a record/playback head 46 and an erase head 47, and is disposed for sliding movement by having stationary pins 49a, 49b, 49c engaged with elongate guide slots 48a, 48b, 48c, respectively, formed therein, as a record/playback operating member such as button (not shown) is operated. The bevelled edge 41a is formed on the end of an arm 41b which extends from the upper, left-hand corner of the plate 41, as viewed in FIG. 6.

When a cassette containing a magnetic tape of a high coercivity type which is to be run at a tape speed of 2.4 cm/sec is mounted on the tape recorder, the cassette will be provided with the detection opening 32a, which is detected by the detecting piece 35a by causing the detecting member 35 to rock counter-clockwise to close the switch $S_0$, thus enabling a low frequency compensation. Simultaneously, the closure of the switch 38 increases the bias applied to the magnetic head. When a cassette containing a magnetic tape of a high coercivity type which is to be run at a tape speed of 1.2 cm/sec is mounted on the tape recorder, the cassette will be provided with the opening 33a, which is detected by the detecting piece 34b by causing the detecting member 34 to rock clockwise about the pivot 39 from the position shown in FIG. 6, thereby opening the switch $S_0$ to change the tape speed to a lower value of 1.2 cm/sec and to increase the bias. When a cassette containing a hematite magnetic tape which is to be run at a tape speed of 2.4 cm/sec is mounted on the tape recorder, neither opening 32a or 33a is present, so that the detecting members 34 and 35 will be rocked counter-clockwise and clockwise about the pivot 39, respectively, opening the both switches $S_0$ and 38. As a result, no low frequency compensation is applied and the bias is decreased.

When the operation of the tape recorder is stopped, the operating plate 41 slides in the opposite direction from that indicated by the arrow a, so that the bevelled edge 41a moves the epending pin 40 so as to rock the detecting member 35 clockwise about the pivot 39, thus moving the detecting piece 35a out of the detection opening 32a. In this manner, the removal of the cassette is facilitated.

While in the embodiment described above, the low frequency compensation has been applied to a cassette tape of a high coercivity type which is to be run at a tape speed of 2.4 cm/sec, it should be understood that a high frequency compensation may also be applied in accordance with the invention since the purpose of the invention is to provide a tone compensation by distinguishing a specific combination from a plurality of varieties of different tape materials and a plurality of tape speeds. In other words, a suitable compensation circuit may be employed for a particular combination of tape material and tape speed.

Figure 9:
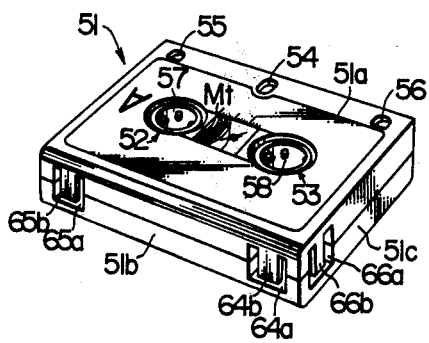
FIGS. 9 and 10 are perspective views showing other examples of tape cassettes constructed in accordance with the invention.
Figure 10:
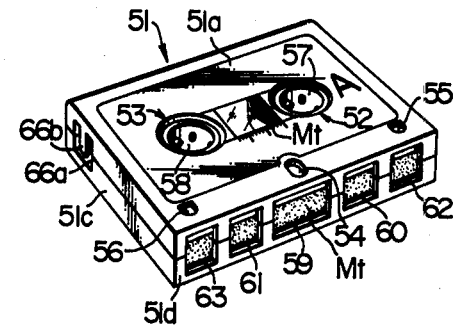

In the embodiments described above, each of the detecting members provided on the part of the tape recorder for mating engagement with individual detection openings formed in the tape cassette have been urged to move into the latter openings under the action of the spring resilience. This may present a difficulty in the loading and removal of the tape cassette into or from the tape recorder, and may also cause damage to associated members. In view of these considerations, it is desirable to hold the detecting members in a position retracted from the path of insertion or withdrawal of the cassette while enabling them to be displaced to respective operative positions during a record/playback mode. Such an embodiment will be described below with reference to FIGS. 9 and 10.

Referring to these Figures, a tape cassette 51 is shown as having an upper major surface 51a, a rear end face 51b, a left-hand edge face 51c and a front end face 51d. A pair of openings 52, 53 are centrally formed in the upper major surface of the cassette for receiving tape hubs, and a capstan aperture 54 is also formed therein at a middle position toward the front end face 51d. Additionally, a pair of positioning apertures 55, 56 extend through the cassette adjacent to opposite ends of the front end face 51d. A pair of tape hubs 57, 58 are rotatably disposed in the openings 52, 53, and a magnetic tape Mt extends from one of the tape hubs 57 to the other hub 58 while being maintained in taut condition along the front end face 51d. Formed in the front end face 51d are an opening 59 for receiving a pinch roller and which is centrally located, a pair of openings 60, 61 for receiving a record/playback head which are located on either side of the opening 59, and also a pair of openings 62, 63 for receiving an erase head which are located adjacent to its opposite ends. Toward its opposite ends, the near end face 51b is formed with a pair of tape speed detection openings 64a, 65a, and a pair of lugs 64b, 65b extend so as to cover these openings. In its end adjacent to the rear end face 51b, the left-hand edge face 51c is formed with an opening 66a and an associated lug 66b which are provided for preventing an inadvertent erasure of a recorded tape. The remaining or right-hand edge face (see FIG. 11) is similarly provided with an opening 67a and its associated lug 67b. The openings 60, 62, 64a and 67a are effective when the tape cassette 51 is loaded on the tape recorder with its A surface or upper major surface 51a facing upward, and the remaining openings are effective when the cassette 51 is loaded with its upper surface 51a facing downwardly.

The tape speed detection openings 64a, 65a and the lugs 64b, 65b may be provided according to a schedule such that the presence of the lugs indicates a high speed while the absence of these lugs indicates a low speed for the running of the magnetic tape Mt. The specific values of the high and low tape speeds are predetermined, for example, to 2.4 and 1.2 cm/sec, respectively. The openings 66a, 67a and their associated lugs 66b, 67b may be provided according to a schedule such that when the lugs are present, a magnetic tape contained in the cassette may be erased while it cannot be erased when the lugs are absent. In the description to follow, these openings 66a, 67a will not be specifically dealt with since they have no direct bearing with the present invention.

Figure 11:
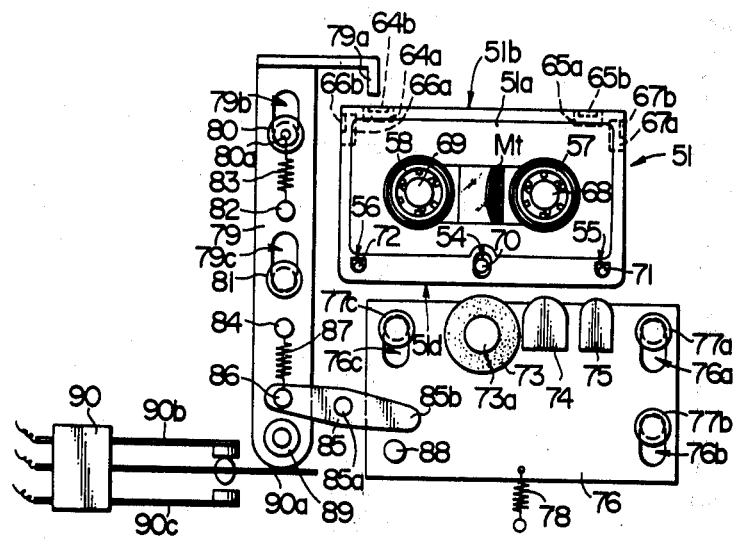
FIGS. 11 to 13 are plan views of an automatic switching device for a cassette tape recorder constructed in accordance with the invention.

As indicated in FIG. 11, the cassette 51 is loaded on the tape recorder in a manner such that a tape supply shaft 68 and a tape take-up shaft 69 provided on the part of the tape recorder engage the tape hubs 57, 58, respectively while a capstan 70 provided on the part of the tape recorder engages the capstan aperture 54. In addition, a pair of positioning pins 71, 72 provided on the tape recorder are adapted to engage the positioning apertures 55, 56, respectively as the cassette is loaded on the tape recorder. When the cassette is loaded, a pinch roller 73, a record/playback head 74 and an erase head 75 provided within the tape recorder are located opposite to the openings 59, 60 and 62, respectively, which are formed in the front end face 51d of the tape cassette 51. The pinch roller 73 is rotatably mounted on a shaft 73a which is fixedly mounted on a support plate 76, on which the heads 74, 75 are also secured. Along its opposite lateral sides, the support plate 76 is formed with elongate slots 76a, 76b, 76c, which are engaged by guide pins 77a, 77b, 77c, respectively, in order to allow a sliding movement of the support plate 76. A coiled spring 78 urges the support plate 76 in a direction to move the pinch roller 73 and the both heads 74, 75 away from the front end face 51d of the tape cassette 51.

A tape speed switching member 79 has its detecting piece 79a located opposite to the tape speed detection opening 64a formed in the rear end face 51b of the cassette 51 when the latter is loaded on the tape recorder. The body of the switching member 79 is located to the left of the cassette 51 and the support plate 76, and is slidably supported by a pair of guide pins 80, 81 which slidably engage a pair of elongate slots 79b, 79c formed therein so that the detecting piece 79a may be moved relative to the end face 51b. The guide pin 80 includes a top projection 80a, which is engaged by one end of a coiled spring 83, the other end of which is engaged with a pin 82 which is fixedly mounted on the body of the switching member 79 at a position intermediate the slots 79b, 79c, whereby the switching member 79 is urged in a direction to move the detecting piece 79a away from the rear end face 51b of the cassette 51.

The body of the switching member 79 fixedly carries another pin 84, which is engaged by one end of a coiled spring 87, the other end of which is engaged with a pin 86 which is in turn fixedly mounted on one arm of a lever-shaped interlocking member 85. The spring 87 has a greater resilience than the spring 83. The interlocking member 85 is rotatably mounted on a pivot 85a, and includes another arm 85b which is located opposite to a pin 88 fixedly mounted on the support plate 76 in the lower, left-hand corner thereof. In the condition shown in FIG. 11, the arm 85b of the interlocking member 85 is displaced from the pin 88.

At its lower end, the body of the switching member 79 has a switch operator 89 of an insulating material secured thereto, and the operator 89 is located adjacent to a movable blade 90a of a change-over switch 90. The switch 90 also includes a pair of blades 90b, 90c which are located on the opposite sides of the movable blade 90a, which is normally urged into engagement with the blade 90b when it is freed from the switch operator 89.

Describing the operation of this embodiment, FIG. 11 shows the stop condition of the tape recorder in which either record or playback mode is inhibited. At this time, the support plate 76 and the switching member 79 are removed from the cassette 51 under the resilience of the coiled springs 78, 83. The cassette 51 can therefore be either loaded or removed from the tape recorder under this condition, and such loading or removal is greatly facilitated because the detecting piece 79a is completely removed from the passage of the cassette 51. Under this condition, the interlocking member 85 is displaced from the pin 88 on the support plate 76.

Figure 12:
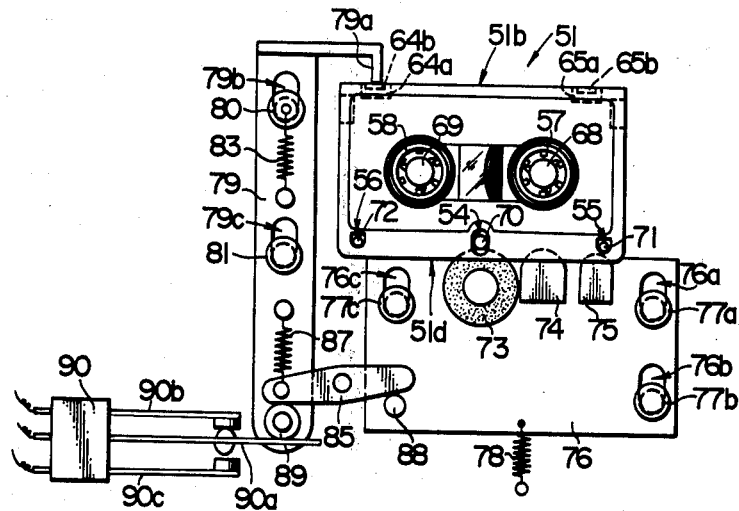
Figure 13:
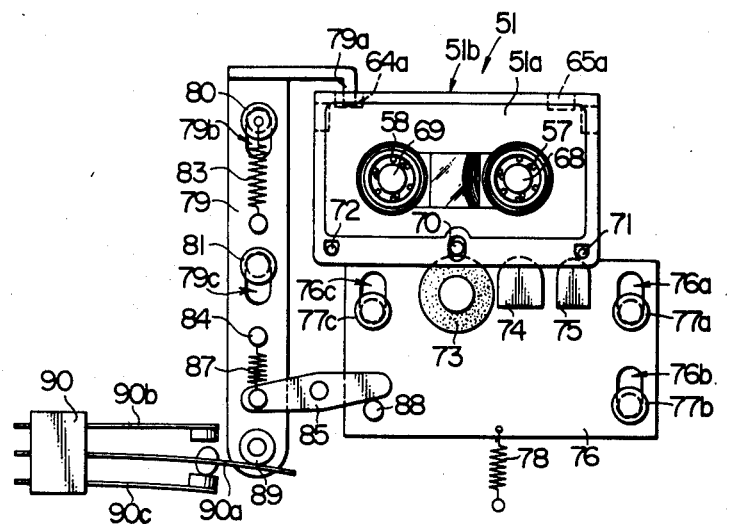

When the cassette 51 is loaded and either a record or playback mode is established, the support plate 76 is moved from the position shown in FIG. 11 to either position shown in FIG. 12 or 13 against the resilience of the coiled spring 78, and is retained in such position by detent means, not shown. As the support plate is moved toward the front end face 51d of the cassette 51, the pinch roller 73 advances into the opening 59 and holds the magnetic tape Mt against the capstan 70. In addition, the record/playback head 74 and the erase head 75 also advance into the openings 60, 62, respectively for contact with the magnetic tape Mt. The capstan 70 is driven for rotation by a drive motor 91 (see FIG. 14), and cooperates with the pinch roller 73 to feed the magnetic tape Mt which is thus run across both heads 74, 75 at a uniform rate for performing a record or playback operation. The tape hub 58 is driven by the tape take-up shaft 69 to take up the magnetic tape Mt thereon. During a playback operation, the erase head 75 remains deenergized or inoperative.

As the support plate 76 moves into either position shown in FIG. 12 or 13, the pin 88 mounted thereon bears against the interlocking member 85 to cause it to rotate counter-clockwise about the pivot 85a from the position shown in FIG. 11, thus applying a pull on the switching member 79 through the coiled spring 87 which overcomes the resilience of the coiled spring 83, as illustrated in FIG. 12 or 13. Thereupon, the detecting piece 79a of the switching member 79 is brought into abutment against the rear end face 51b of the cassette 51 so as to be capable of detecting either presence or absence of the tape speed detection opening 64a therein.

In FIG. 12, the rear end face 51b of the cassette 51 is provided with the lug 64b which covers the detection opening 64a, so that the switching member 79 is not sufficiently displaced to cause its switch operator 89 to engage the movable blade 90a. Consequently, the movable blade 90a remains in contact with the blade 90b, which maintains a high tape speed.

In FIG. 13, the tape speed detection opening 64a is not covered by the lug 64b, so that the detecting piece 79a is forced into the detection opening 74a under the resilience of the coiled spring 87, whereby the switch operator 89 is sufficiently displaced to engage and move the movable blade 90a, which is moved away from the blade 90b and into contact with the other blade 90c. Such a switching of the switch 90 establishes a low tape speed.

Figure 14:
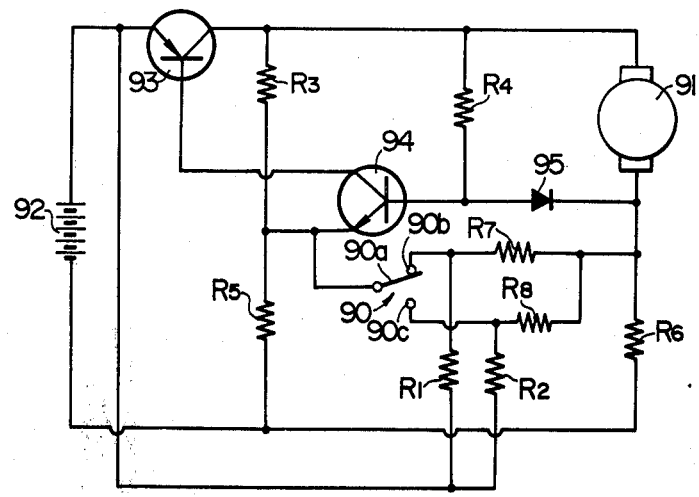
FIG. 14 is a circuit diagram of a motor servo circuit for switching the tape speed.

FIG. 14 shows a conventional motor servo circuit which is adapted to control the speed of rotation of the drive motor 91 associated with the capstan 70. There is shown a power source 92, the positive terminal of which is connected with the emitter of a transistor 93 and one end each of resistors $R_1$ and $R_2$. The collector of the transistor 93 is connected with one terminal of the motor 91 and also with one end of resistors $R_3$, $R_4$. The base of the transistor 93 is connected with the collector of a comparison transistor 94, the base of which is connected with the other end of the resistor $R_4$ and is also connected through a diode 95 with the other terminal of the motor 91. The other end of the resistor $R_3$ is connected with one end of a resistor $R_5$, and the junction therebetween is connected with the movable blade 90a of the change-over switch 90 and also with the emitter of the transistor 94. The other terminal of the motor 91 is connected with one end of resistors $R_6$, $R_7$, $R_8$, and the other end of the resistors $R_5$, $R_6$ is connected with the negative terminal of the power source 92. The blade 90b of the switch 90 is connected with the other end of the resistors $R_1$ and $R_7$ while the other blade 90c is connected with the other end of the resistors $R_2$ and $R_8$.

The motor 91 and the resistors $R_3$, $R_5$ and $R_6$ form the branches of a bridge circuit, and the base-emitter path of the comparison transistor 94 is connected to detect any difference in the potential across the output resistor $R_4$ and the motor 91 to change the base potential of the transistor 93 in order to control the voltage applied across the bridge circuit, thus automatically controlling the power supply to the motor 91. When the movable blade 90a is in contact with either blade 90b or 90c, the corresponding resistor $R_7$ or $R_8$ is connected in shunt with the bridge resistors $R_5$ and $R_6$, whereby the voltage applied across the bridge circuit is changed by the cooperation of the transistors 93 and 94 to vary the power supply to the motor 91 in two stages. In the present embodiment, when the blade 90a is in contact with the blade 90b, the motor 91 is energized for rotation at a high speed while when the movable blade 90a is in contact with the other blade 90c, the motor is energized to rotate at a low speed. Once the movable blade 90a contacts either blade 90b or 90c, the speed of rotation of the motor 91 is maintained constant by the cooperation of the transistors 94, 93. The rotation of the motor 91 is transmitted to the capstan 70 through a well-known mechanism, thus determining the tape running speed.

In the embodiment described above, any other control circuit may be used for controlling the rotation of the capstan driving motor, and it is also to be understood that various modifications and changes can be made in the described embodiment without departing from the spirit of the invention. In particular, the interlocking member may be constructed as a slide rather than a lever. The specific values given above for the tape running speeds may be established as desired. Also, it is quite permissible to choose either the presence or absence of the tape speed detection opening for a high or low tape speed, provided such design criterion is followed consistently once it is determined. The present embodiment is also applicable where a switching of the tone compensation circuit is desired simultaneously with a switching of the tape speed. Additionally, the interlocking member 85 may be operated by means other than the support plate 76, such as a member which undergoes a displacement as the record or playback button is depressed. It is to be noted that the tape speed switching member is controlled by a member which is operated in response to the depression of the record/playback button, so that a sufficient force is available to operate a change-over switch having a high contact pressure, assuring a reliable switching action and also enabling a switching of an additional circuit such as the tone compensation circuit.

Figure 15:
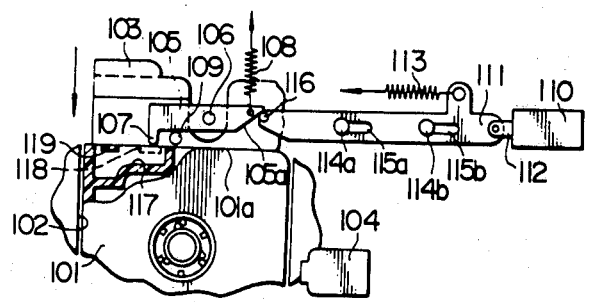
FIGS. 15 to 23 are schematic plan views of other various embodiments of the automatic switching device according to the invention.
Figure 16:
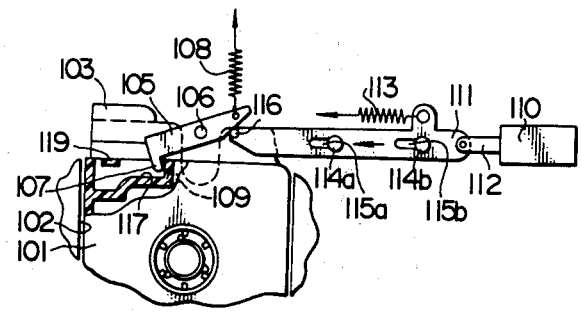

FIGS. 15 and 16 illustrate another embodiment of the automatic switching device which achieves a result similar to the embodiments described above. Specifically, a tape cassette 101 is shown disposed in a cassette receiving chamber 102 of a tape recorder which is shown as having a record or playback button 103 and a record/playback head 104. The head is adapted to cooperate with a magnetic tape contained in the cassette as the button 103 is operated. A detecting lever 105 is pivotally mounted on a pin 106 adjacent to one sidewall of the cassette receiving chamber 102, and includes a detecting piece 107 formed at its one end which is biased to extend into the chamber 102 by a tension spring 108 extending between the other end of the lever 105 and a stationary member. A stop pin 109 integral with the button 103 is located so as to normally maintain the detecting piece 107 outside of the chamber 102 even though it is biased by the spring 108. A switch 110 is provided for changing a bias applied to the magnetic head or a tape speed, and is connected with a sliding plate 111 which is coupled with an actuator 112 of the switch. Adjacent to its end nearer the switch 110, the sliding plate 111 is coupled to one end of a spring 113, the other end of which is secured to a stationary member. The plate 111 is formed with a pair of spaced elongate slots 115a, 115b which are engaged by stationary pins 114a, 114b for permitting a sliding movement thereof. At its other end, the lever 105 is formed with a bevelled end face 105a, against which the other end of the sliding plate 111 bears under the resilience of the spring 113. At this end, the sliding plate 111 carries a pin 116 for engagement with the bevelled end face 105a so that as the lever 105 moves angularly as shown in FIG. 16, the pin 116 slides along the end face 105a to permit the plate 111 to slide in the direction indicated by an arrow to change the switch 110, thus switching the magnitude of a bias current or a frequency thereof or a tape speed which is utilized in the tape recorder. It is also possible to connect or disconnect a record or playback equalizer at the same time as the bias or the tape speed is changed. At this end, a notch 117 is formed in one sidewall 101a of the casing of the cassette, and is left open or blocked by a lug 118, shown in phantom lines, depending on the magnitude of a desired bias current or a frequency thereof or a desired tape speed. Alternatively, the opening of the notch 117 may be blocked as by an adhesive tape. Another lug 119 is shown which is used for the purpose of preventing an inadvertent erasure of a recorded tape.

In operation, if a cassette having its notch 117 blocked by the lug 118 or an adhesive tape is loaded into the cassette receiving chamber 102, the depression of the record or playback button 103 in the direction indicated by an arrow will carry the stop pin 109 together therewith, so that the pin 109 no longer prevents movement of the detecting lever 105. However, a rotation of the detecting lever 105 is prevented by the abutment of the detecting piece 107 against the lug 118 or the tape, so that the switch 110 remains unchanged.

On the contrary, when a cassette having the lug 118 removed therefrom or having the notch 117 which remains open is loaded into the cassette receiving chamber 102, the depression of the record or playback button 103 in the direction of the arrow permits an inward movement of the pin 109 together therewith, whereby it no longer prevents a movement of the detecting lever 105, which therefore rotates about the pin 106 under the resilience of the spring 108. As a result, the pin 116 on the sliding plate 111 will move along the bevelled end face of the lever 105, causing a movement of the sliding plate 111 to change the switch 110, thereby automatically switching the magnitude of a bias current or frequency thereof or a tape speed which is employed in the tape recorder.

Figure 17:
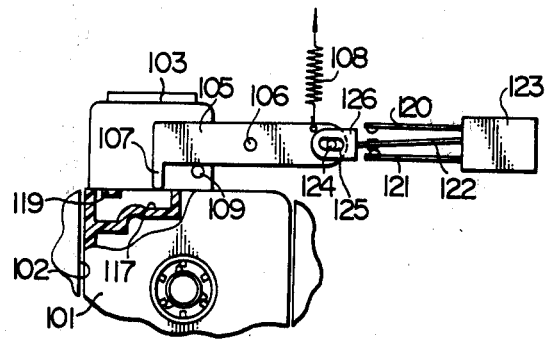
Figure 18:
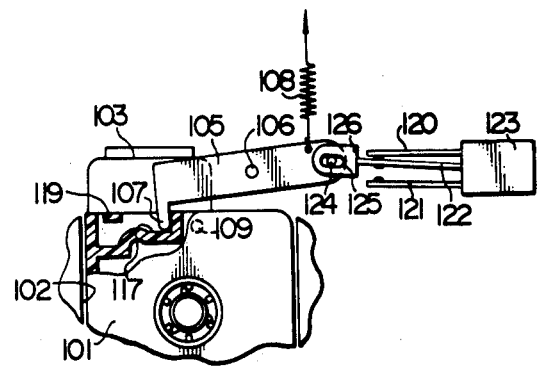

FIGS. 17 and 18 show a modification of the embodiment shown in FIGS. 15 and 16 in that the rotation of the detecting lever is directly utilized to change the switch. Similar parts are designated by like numerals, and will not be specifically described. In FIGS. 17 and 18, the switch 110 of the previous embodiment is replaced by a two position switch 123 comprising a pair of stationary blades 120, 121 and a movable blade 122. This switch can be utilized as either bias or tape speed changing switch. The movable blade 122 is connected with the detecting lever 105 through a connecting piece 126 having a slot 125 which is engaged by a pin 124 fixedly mounted on the nearer end of the detecting lever 105. As in the previous embodiment, as the detecting lever 105 rotates around the pin 106, the switch 123 can be changed.

Figure 19:
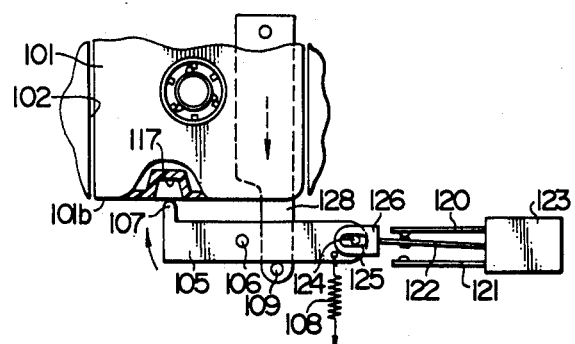

FIG. 19 shows an embodiment of the automatic switching device in which the notch 117 and the lug 118 are formed in the cassette 101 on the opposite side from the record/playback button. In the present embodiment, a lever 128 which is integrally operated with the record or playback button extends across the cassette receiving chamber 102 to the opposite side thereof, and the pin 109 is located thereon on this side. The detecting lever is also disposed on the opposite side of the cassette so that its detecting piece 107 can be advanced into the notch 117 which is formed in an opposite sidewall 101b of the cassette casing. In other respects, the arrangement and operation is similar to that described in connection with FIGS. 17 and 18.

Figure 20:
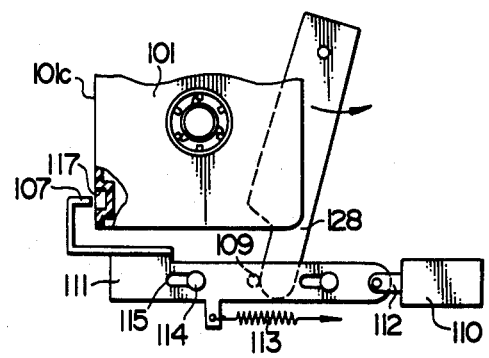
Figure 21:
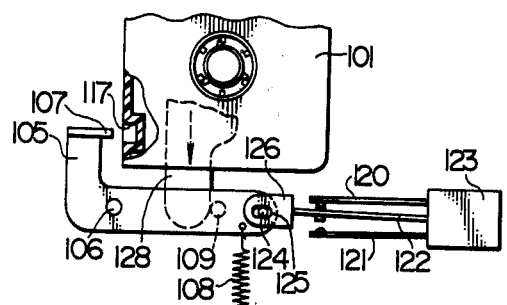

FIGS. 20 and 21 show two alternate arrangements in which the detecting member is disposed so that its detecting piece 107 can be advanced into a notch 117 which is formed in a rear sidewall 101c of the cassette 101. In the arrangement of FIG. 20, an L-shaped detecting piece 107 is attached to the free end of the sliding plate 111, and the lever 128 which is driven by the record or playback button 103 (not shown in this Figure) is rotated in the direction indicated by an arrow. In other respects, the arrangement is similar to those described above. In FIG. 21, the arrangement is similar to that shown in FIG. 17 except that the direction of movement of the lever 128 which is driven by the record or playback button is changed, as indicated by an arrow.

Figure 22:
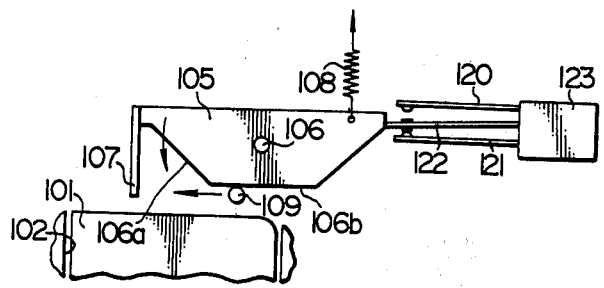

In FIG. 22, the detecting lever 105 is formed with a bevelled edge 106a adjacent to the detecting piece 107, and the pin 109 which is secured to or integral with the record or playback button (not shown) is adapted to move in the direction indicated by an arrow. Normally, the pin 109 bears against the horizontal bottom edge of the detecting member 105, but when the button is operated to move the pin in the direction of the arrow, the detecting lever 105 rotates counter-clockwise while bearing against the pin 109, thus changing the switch 123 in a manner similar to the arrangement of FIG. 17.

Figure 23:
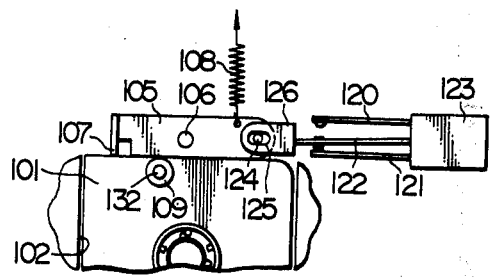
Figure 24:
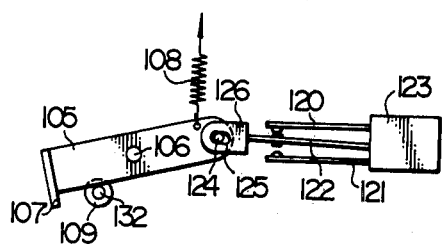
FIG. 24 is a schematic plan view, illustrating the manner of operation of the embodiment shown in FIG. 23.
Figure 25:
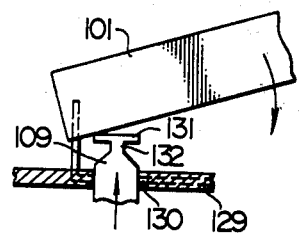
FIG. 25 is a schematic side elevation, showing the construction of a part of the embodiment shown in FIG. 23.

FIGS. 23 to 25 show an embodiment in which the pin 109 is operated by a mounting operation of the cassette rather than by the depression of the record or playback button. As shown, the pin 109 is mounted in an opening 130 which is formed in a bottom plate 129 (see FIG. 25) of the cassette receiving chamber 102, and is formed with a top flat head 131 and a neck of a reduced diameter 132. The arrangement is such that the head of the pin 109 is resiliently biased so as to normally project above the bottom plate 129, but can be depressed as the cassette 101 is loaded into the chamber 102 so that the neck 132 is situated level with the detecting lever 105. If the cassette 101 is not provided with the lug which bears against the detecting piece 107 of the detecting lever 105, the detecting lever 105 is permitted to rotate under the action of the resilience until it bears against the neck 132, thus operating the switch 123 in the similar manner as mentioned previously.

Figure 26:
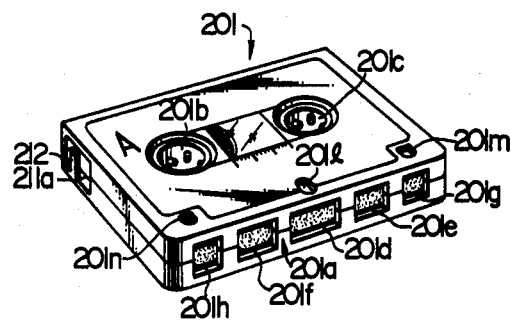
FIG. 26 is a perspective view of a micro-cassette constructed in accordance with the invention.
Figure 27:
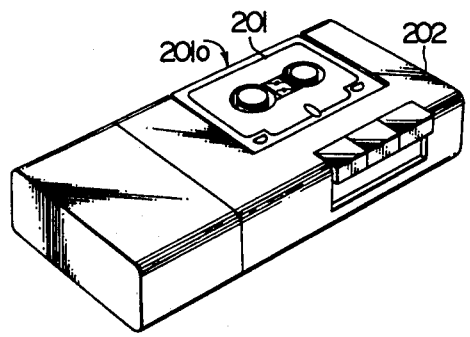
FIGS. 27 and 28 are perspective views, illustrating a miniature cassette tape recorder for use with the micro-cassette shown in FIG. 26 in their horizontal and vertical positions.
Figure 28:
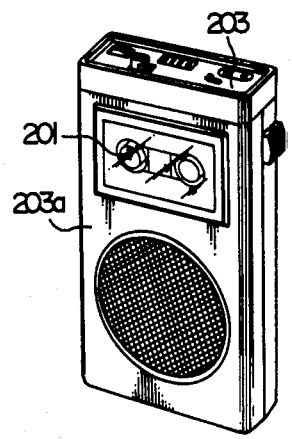

Referring to FIGS. 26 to 39, several embodiments of the automatic switching device will be described as it is applied to a miniature tape recorder adapted for use with a micro-cassette of a size comparable to that of a packet of matches. To provide convenience to the portable use, the miniature tape recorder is constructed as shown in FIG. 27 wherein the rear major surface of the cassette is flush with the surface of the recorder housing. As shown in FIG. 28, it is desirable that the recorder be elongate in configuration so as to be entirely received in a pocket of a suit or shirt, and it is desirable that the rear surface of the cassette be free from any detecting capability. FIG. 26 shows, in perspective, a miniature tape cassette or micro-cassette, as developed by the present applicant. The micro-cassette 201 includes a pair of spaced tape hubs 201b, 201c which are rotatably disposed thereon, and a length of magnetic tape is carried thereon with its opposite ends secured to the respective hubs. A portion of the tape extends along a number of openings formed in a front end face 201a of the cassette 201. These openings include an opening 201d for receiving a pinch roller, a pair of openings 201e, 201f located on opposite sides of the central opening 201d for receiving a magnetic head, and a pair of openings 201g, 201h which are located on the outermost opposite sides of opening 201d for receiving an erase head.

The cassette 201 is also formed with a capstan aperture 201l and a pair of cassette positioning apertures 201m, 201n, all of which completely extend through the cassette. In addition, a pair of recesses 211 are formed in the opposite sidewalls, and a lug 212 is located in each recess 211 for the purpose of preventing an inadvertent erasure of a recorded tape.

A miniature tape recorder 202 for use with such a micro-cassette 201 may be constructed as shown in FIG. 27 in which the rear major surface 201₀ is flush with the surface of the housing of the recorder 202. Alternatively, a miniature tape recorder 203 as shown in FIG. 28 may be used which is provided with a sliding or swingable lid 203a. In either configuration, it is difficult to utilize the rear surface of the cassette for the purpose of detection. For this reason, it is advisable to enlarge the recess 211a to provide a detection opening 211b (see FIGS. 29, 32 and 36) when the cassette contains a magnetic tape of a high coercivity type. However, if a detecting lever which is designed to cooperate with the detection opening 211a is normally biased to extend into such opening, it is engaged by the lower wall of the cassette to cause a deformation of the detecting lever or to prevent the loading of the cassette when the latter is loaded. Additionally, a difficulty may be experienced in withdrawing the cassette from the recorder as a result of interference between the detecting lever and the detection opening. In accordance with the invention, such difficulty or inconvenience is avoided by maintaining the detecting lever in a position retracted from the detection opening when the recorder is inoperative or during the loading and withdrawal of the cassette, but allowing the detecting lever to be moved into the detection opening at least during a record or playback mode.

Figure 29:
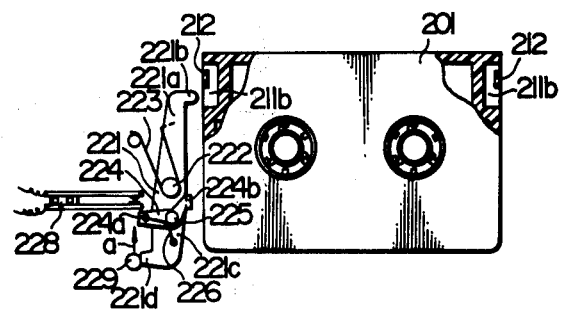
FIG. 29 is a plan view, partly in section, of an automatic switching device according to the invention as applied to a miniature tape recorder.
Figure 30:
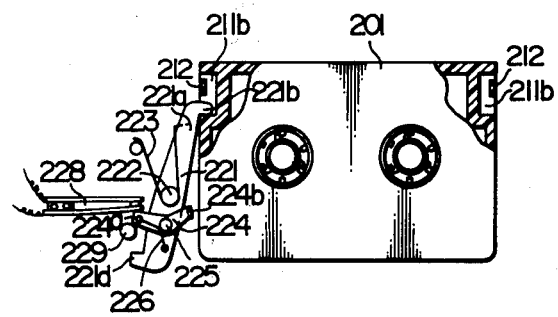
FIGS. 30 and 31 are similar views to FIG. 29, illustrating the operation of the apparatus shown in FIG. 29.

FIG. 29 is a plan view of one embodiment of the invention. A detecting lever 221 is pivotally mounted on a pin 222 at a position adjacent to one sidewall of the microcassette 201 when the latter is loaded into the tape recorder. The lever 221 includes an arm 221a which extends upwardly and generally parallel to the sidewall of the cassette 201, with its free end being bent toward this sidewall to form a detecting piece 221b which is located opposite to the detection opening 211b in the cassette 201. The lever also includes another arm 221c which extends in the opposite direction from the arm 221a, and the free end of the arm 221c is formed with an abutment 221d which is bent to extend in the opposite direction from the detecting piece 221b. A torsion spring 223 is disposed on the pin 222 to urge the detecting lever 221 to rotate clockwise about the pin 222. However, the resulting movement of the lever is normally limited by the engagement between the abutment 221d and a pin 229 fixedly mounted on a movable portion of a change-over switch which switches between a record and a playback amplifier circuit. Alternatively, the pin 229 may be mounted on a member which actuates the switch. When the switch is changed to a record mode, the pin 229 travels to a given position in the direction indicated by an arrow a. In FIG. 29, it is shown in a position which it assumes during a playback mode.

A pawl member 224 is pivotally mounted on a pin 225 which is fixedly mounted on the arm 221c of the detecting lever 221. The pawl member 224 is in the form of a bellcrank-shaped lever having an arm 224a which extends in a direction perpendicular to the length of the lever 221 so as to move into the path of movement of the pin 229 when the lever 221 rocks clockwise. A torsion spring 226 is disposed on the pin 225 to urge the pawl member 224 to rotate counter-clockwise about the pin 225. However, the resulting rotation of the pawl member is normally limited by a downwardly depending piece 224b formed on the end of its other arm which engages the lateral edge of the arm 221c of the lever 221. The detecting lever 221 and the pawl member 224 form a twin lever in that the pawl member 224 moves as the detecting lever 221 rocks while the pawl member 224 is capable of movement alone.

Figure 35:
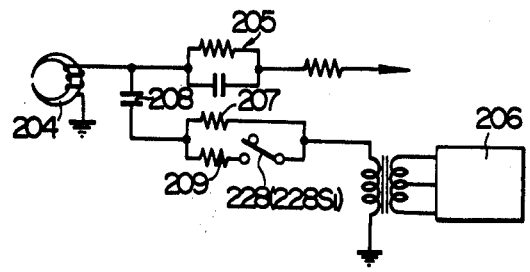
FIG. 35 is a circuit diagram of a recording bias current switching circuit.

A bias changing switch 228 is disposed adjacent to the free end of the arm 224a of the pawl member 224. The switch 228 includes a movable blade for forming a normally open switch, and when it is closed, a bias current applied to a record/playback head is increased. Referring to FIG. 35, there is shown a bias circuit in which the switch 228 is connected. The circuit includes a record equalizer circuit 205 and an oscillator 206, the output of which is normally applied through a resistor 207 and a capacitor 208, connected in series, to a record/playback head 204. The switch 228 is connected in series with a resistor 209 across the resistor 207. Thus, when the switch 228 is closed, the composite resistance presented by the combination of resistors 207, 209 is reduced to increase the bias current applied to the head 204.

When a tape cassette containing a magnetic tape of a high coercivity type is loaded into the mixture tape recorder and the latter changed from a playback to a record mode, the pin 229 moves in the direction of the arrow a and thus is disengaged from the abutment 221d of the detecting lever 221. Since the cassette 201 loaded is provided with the detection opening 211b, the lever 221 rocks clockwise about the pivot 222 under the resilience of the spring 223, moving the detecting piece 221b into the detection opening 211b. As it rocks, the pawl member 224 moves integrally therewith, and its arm 224a moves into the path of movement of the pin 229. Thereupon, the arm 224a is driven by the pin 229 to cause the pawl member 224 to be rotated clockwise about the pin 225 against the bias of spring 226. As the pin 229 moves to the given position which it assumes during a record mode, the arm 224a closes the switch 228, which therefore connects the resistor 209 in circuit to increase the bias applied to the head 204.

Figure 31:
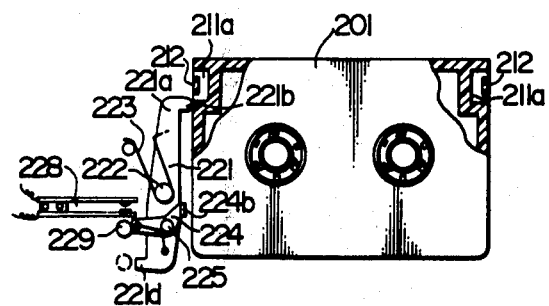

When a tape cassette is loaded which contains a magnetic tape other than the high coercivity type and hence is devoid of the detection opening 211b, as shown in FIG. 31, a rocking motion of the detecting lever 221 is prevented as the pin 229 moves from its playback to its record position, so that the arm 224a of the pawl member 224 cannot move into the path of movement of the pin 229, thus allowing the switch 228 to remain open and hence maintaining the bias current applied to the head 204 unchanged.

Figure 32:
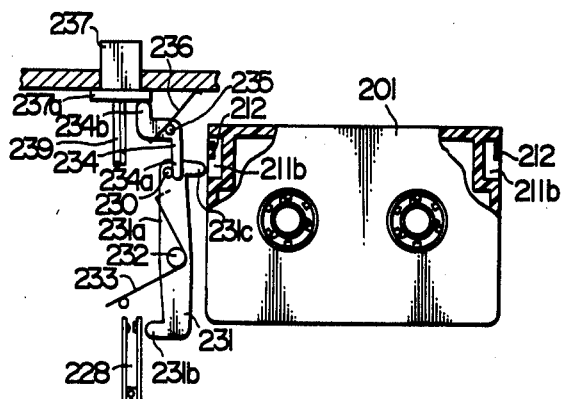
FIG. 32 is a plan view, partly in section, of a modification of the apparatus shown in FIG. 29.
Figure 33:
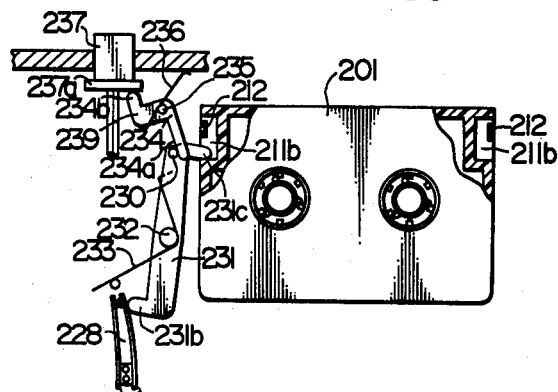
FIGS. 33 and 34 are similar views to FIG. 32, illustrating the operation of the apparatus shown in FIG. 32.
Figure 34:
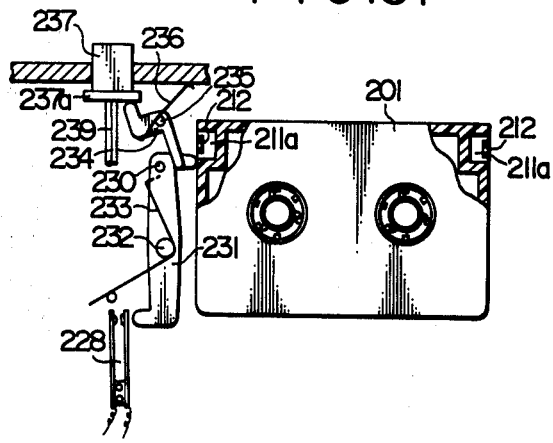

FIG. 32 shows another embodiment in which the twin lever arrangement of the previous embodiment is replaced by a detecting lever 231 which is rocked by a lever interlocked with a record button 237. The detecting lever 231 is similar in construction to the previous embodiment shown in FIG. 29, and is pivotally mounted on a pin 232 and is urged to rock clockwise thereabout by a spring 233. The resulting rocking motion of the lever is normally limited by the abutment of a pin 230 fixedly mounted on an arm 231a of the lever 231 against an arm 234a of an interconnecting lever 234. The interconnecting lever 234 is an inverted L-shaped lever which is pivotally mounted on a pin 235. The lever 234 is biased to rock clockwise about the pin 235 by a torsion spring 236 disposed thereon and having a strong resilience. However, the resulting rocking movement of the lever 234 is normally prevented by the abutment of its arm 234b against a flange 237a of the record button 237.

The bias changing switch 228 is disposed adjacent to another arm 231b of the detecting lever 231, and is adapted to be closed by the arm 231b as the detecting lever 231 rocks clockwise about the pin 232. As the record button 237 is depressed, an amplifier switch (not shown) is changed from a playback position to a record position. A rod 239 is shown which moves downwardly, as viewed in FIG. 32, as the button 237 is depressed, for the purpose of pre-conditioning the amplifier switch for a switching operation.

When a tape cassette containing a magnetic tape of a high coercivity type is loaded and the record button 237 depressed, the interconnecting lever 234 rocks counterclockwise about the pin 235 against the resilience of the spring 236, whereby the detecting lever 231 is released therefrom to rock clockwise about the pin 232 under the action of the spring 233, thus moving the detecting piece 231c into the detection opening 211b and closing the switch 228 with its arm 231b. The closure of the switch 228 increases the bias current applied to the head 204, as illustrated in FIG. 35.

When a tape cassette having no detection opening 211b is loaded (FIG. 34), the depression of the record button 237 merely results in a rocking motion of the interconnecting lever 234, while a rocking motion of the detecting lever 231 is prevented by the absence of the detection opening 211b. As a result, the switch 228 remains open, and the same bias current is maintained.

While in the two embodiments described above, only the bias applied to the head 204 has been controlled by the presence or absence of the detection opening 211b in the tape cassette which is detected by the detecting levers 221, 231, it is contemplated, and is preferable where a high fidelity recording is performed, to use another switch which is ganged with the switch 228 to change the recording equalizer response in accordance with the variety of the tape material. Another consideration to be paid is the good recording response which is usually achieved for the high frequency region. Therefore, it is desirable to provide an equalization for the low frequency in order to obtain a balanced output during the playback mode. To this end, it is necessary to control the equalization response by detecting the presence or absence of an additional detection opening formed in the tape cassette which is similar to the one shown at 211b, during the playback mode. If such an arrangement is to be implemented, there is a need, in addition to the mechanism which changes the switch 228 in response to an operation of the record button, for a switching mechanism which operates in response to an operation of a playback button. Such an arrangement is shown in FIG. 36.

Figure 36:
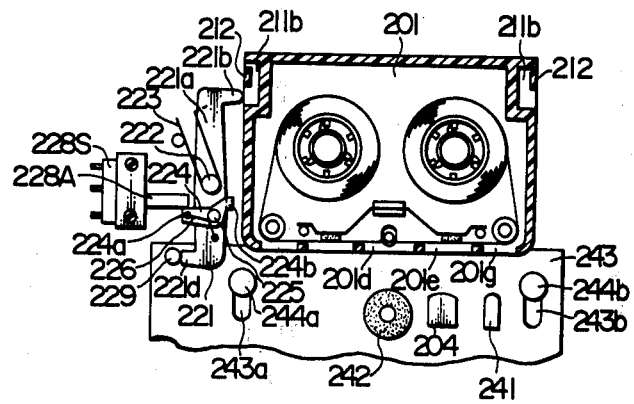
FIG. 36 is a plan view of a further embodiment of the apparatus according to the invention.

Referring to FIG. 36, the switch 228 is replaced by a ganged change-over switch 228S so that the detection of the detection opening 211b during a recording on a magnetic tape of a high coercivity type controls the recording bias circuit while such detection is utilized during a playback mode to control a reproducing circuit. It should be noted that the arrangement of the detecting lever in the embodiment of FIG. 36 is of the same twin lever type as shown in FIG. 29, and therefore corresponding parts are designated by like reference characters without repeating the description of the detailed construction.

In FIG. 36, the pin 229 is fixedly mounted on an operating plate 243 on which the record/playback head 204, an erase head 241 and a pinch roller 242 are mounted. The plate 243 is formed with a pair of elongate guide slots 243a, 243b along its opposite sides, which slots are engaged by stationary pins 224a, 224b so as to permit a sliding movement of the plate toward the cassette 201 loaded, as a record or playback mode is established by the operation of the record or playback button or associated member (not shown). It will be appreciated that the heads 204, 241 and the pinch roller 242 are located to advance into associated openings 201d, 201e and 201g formed in the front end face 201a (see FIG. 26) of the cassette so as to contact the tape contained therein. As the operating plate 243 slides in the manner mentioned above, the pin 229 also moves toward an actuator 228A of the switch 228S, which is a ganged double pole switch. During a record or playback mode of the recorder, the actuator 228A is operated upon by the pin 229 through the arm 224a of the pawl member 224 when the presence of the detection opening 211b is detected by the detecting lever 221.

Figure 39:
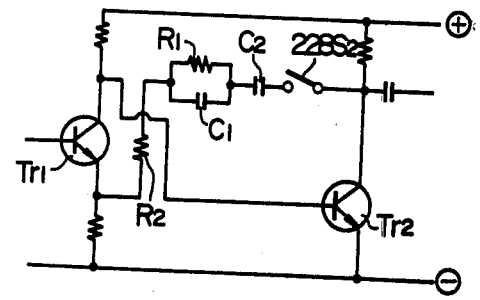
FIG. 39 is a circuit diagram of an equalizer circuit which provides low frequency compensation.

FIG. 39 shows one example of a low frequency compensating equalizer circuit comprising resistors $R_1$, $R_2$ and capacitors $C_1$, $C_2$ and which is connected between a pair of amplifier transistors $Tr_1$, $Tr_2$ through one switch portion $228S_2$ of the switch 228S. The switch 228S includes another switch portion 228S₁ which is connected as shown in FIG. 35 to control the recording bias current.

Figure 37:
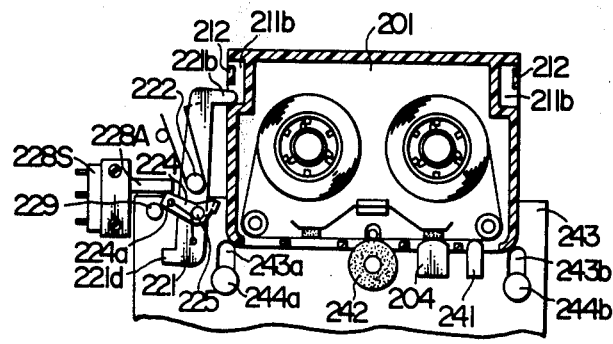
FIGS. 37 and 38 are similar views to FIG. 36, showing the operation of the apparatus shown in FIG. 36.

With this arrangement, when a tape cassette containing a magnetic tape of a high coercivity type is loaded and the recorder is set to a record or playback mode, the operating plate 243 slides toward the cassette 201 as shown in FIG. 37, whereby the pin 229 is disengaged from the abutment 221d of the detecting lever 221, allowing the detecting lever 221 to rock clockwise about the pin 222 under the bias of the spring 223. As it rocks, the pin 229 operates on the actuator 228A through the arm 224a of the pawl member 224 to move it upward, as viewed in FIG. 37, whereby the contacts 228S₁ (FIG. 35), 228S₂ (FIG. 39) are closed. Thus, the recording bias circuit shown in FIG. 35 is switched to a level which is suitable for a magnetic tape of a high coercivity type while during a playback operation, the low frequency equalizer circuit is connected in circuit to provide a compensation for the low frequency. While both contacts 228S₁ and 22SS₂ are switched simultaneously, it should be understood that a known recorder includes a record/playback change-over switch (not shown) in its amplifier circuit so that only the bias circuit is effective during a record mode and only the low frequency equalizer circuit is effective during a playback mode.

When a tape cassette containing a magnetic tape other than the high coercivity type is loaded (see FIG. 38), the movement of the operating member 43 to its operative position which it assumes during a record or playback mode does not cause a rocking motion of the detecting lever 221 because of the absence of the detection opening 211b, so that the condition of switch 228S is not changed. As a result, the bias current is not changed, nor is a compensation for the low frequency applied. By substituting a triple pole switch for the switch 228S, a compensation for the high frequency can be achieved during a record mode for a magnetic tape other than the high coercivity type.

Figure 38:
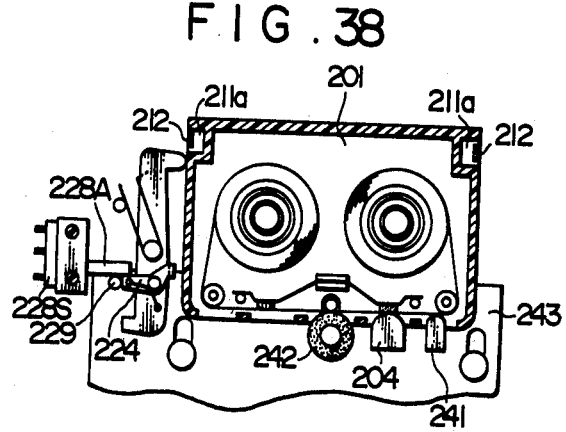

In the embodiment shown in FIGS. 36 to 38, the detection of the presence or absence of the detection opening is achieved by utilizing the detecting lever which is capable of operation with a low level of force, while a force of a higher level which is available from the record or playback button is utilized to change the switch in association with the operation of the detecting lever, thus assuring a reliable switching action. In the prior art practice, means for detecting a detection opening in the cassette has been constructed such that in the absence of the detection opening, the detecting lever slides against the resilience of a spring to operate a bias changing switch to a position in which an amplifier circuit which is suitable for reproduction from γ-hematite tape is connected, while in the presence of the detection opening, the detecting lever remains immovable to operate the switch to a position associated with an amplifier circuit which is suitable for a high coercivity tape. With such means, the spring must be strong enough to supply a force for operating the switch, and since the cassette is utilized to move the detecting lever against the action of such spring in the absence of the detection opening, a substantial force is exerted on the cassette, which is therefore vulnerable to misalignment. In particular, as the size of the cassette is reduced, the positioning pins associated with the cassette are more closely spaced and have a reduced pin diameter while the force exerted on the cassette remains unchanged, so that the influence of the reaction of the detecting lever on the cassette is increased. It will be appreciated that the record or playback performance will be greatly influenced if the azimuth of the cassette deviates from the proper orientation. By contrast, with the device according to the invention, the change-over switch is operated by a force available from the record/playback button while the detecting member will be operated with a reduced level of force, so that the above disadvantages are overcome. In addition, in the inoperative position of the tape recorder, the detecting member is maintained in a retracted position which avoids an interference with the loading or withdrawal of the cassette.

The automatic switching devices described above have been constructed with a switch which functions to change the tape speed. Now a different type of automatic switching device which relies for its operation on mechanical means interconnecting a capstan drive shaft with the drive shaft of the motor will be described with reference to FIGS. 40 to 46. However, it is to be noted that the arrangement of utilizing a detecting member which is operable to detect the presence or absence of a detection opening formed in the cassette with a reduced force and of utilizing an increased force available from the depression of a record or playback button to change the tape speed, as described above in connection with the preceding embodiments, remains unchanged.

Figure 40:
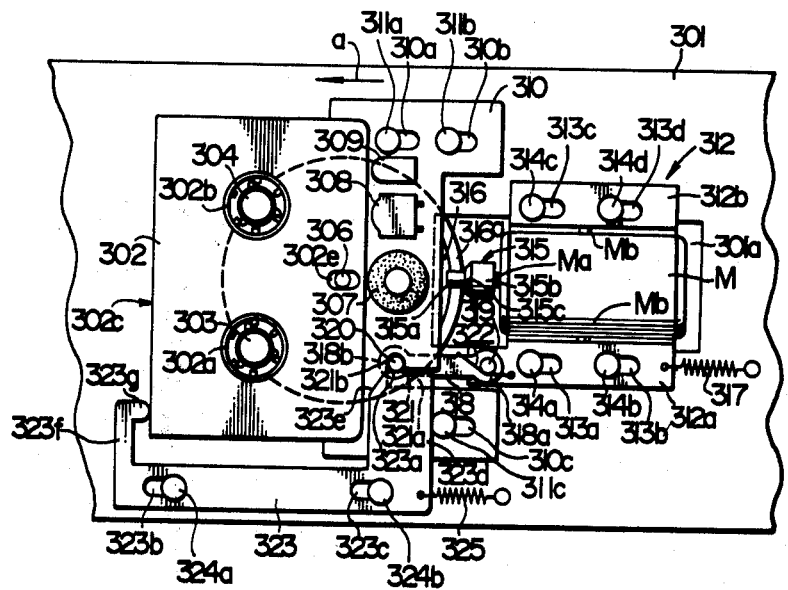
FIG. 40 is a plan view of an additional embodiment of the automatic switching device according to the invention.

In the embodiment shown in FIG. 40, a tape drive motor M is slidably disposed within a tape recorder so that its rotary shaft extends in a horizontal direction, and a stepped pulley is mounted on the output shaft Ma to enable the tape speed to be changed between a high and a low rate.

Referring to FIG. 40, a stationary base plate 301 is fixed within the recorder, and rotatably mounted in the base plate 301 are a tape take-up shaft 303 and a tape supply shaft 304 which are adapted to engage tape hubs 302a, 302b of a tape cassette 302 when the latter is loaded into the recorder. A drive is selectively applied to the tape take-up shaft 303 selectively, as will be further described later. The cassette includes a capstan aperture 302e, into which a capstan 306 extends when the cassette is loaded, the capstan 306 cooperating with a pinch roller 307 to feed the tape. The pinch roller 307 is disposed on an operating plate 310 together with a record/playback head 308 and an erase head 309, and the plate 310 is formed with elongate guide slots 310a, 310b, 310c, which are engaged by guide pins 311a, 311b, 311c, respectively, fixedly mounted on the base plate 301, thus enabling the plate 310 to be moved in the direction indicated by an arrow a as a record or playback button (not shown) is operated. In this manner, the pinch roller 307 and the heads 308, 309 can be advanced into associated openings formed in the front end face of the cassette 302 loaded for contact with the surface of the magnetic tape.

Figure 41:
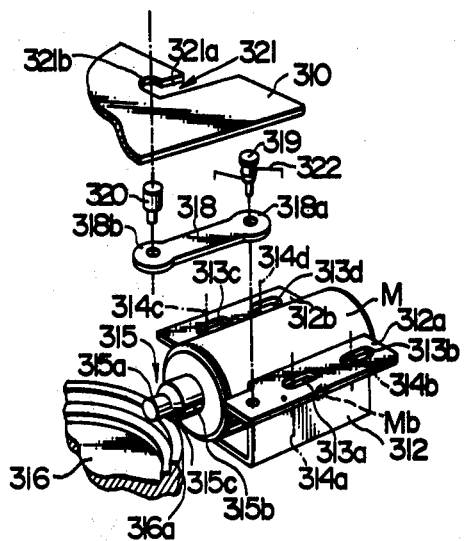
FIG. 41 is a fragmentary perspective view, to an enlarged scale, of FIG. 40.

The tape drive motor M is disposed to the right of the operating plate 310, as viewed in FIG. 40. Specifically, the stationary base plate 301 is formed with a rectangular slot 301a at a position to the right of the operating plate 310, and the motor M is horizontally disposed within the slot 301a by being carried on a motor holder 312. As shown in FIG. 41, the motor holder 312 is channel-shaped and includes a pair of flanges which extend outwardly and at right angles from the limbs of the channel configuration, thereby forming a pair of fixtures 312a, 312b for securing it to the base plate 301. Each of the fixtures 312a, 312b is provided with a pair of spaced guide slots 313a, 313b, 313c, 313d which are elongate lengthwise and which are engaged by pins 314a, 314b, 314c, 314d, respectively, secured to the base plate 301, thus making the motor holder 312 slidable within the slot 301a of the base plate 301.

As indicated in FIG. 40, the motor M is horizontally disposed in the holder 312 by providing a pair of stubs Mb which extend from the motor housing in a direction normal to the output shaft Ma of the motor and which are rockably received in the opposite limbs of the motor holder 312 in the manner of a trunnion. The housing of the motor M is biased for a counter-clockwise rotation about the stubs Mb by a spring, not shown. Such a bias is effective to cause a pulley 315 fixedly mounted on the output shaft Ma of the motor M to bear against the periphery of a flywheel 316 to transmit the drive from the motor M to the flywheel 316 and thence to the capstan 306 which is fixed on the flywheel 316 in axial alignment therewith.

As indicated in FIG. 41, the periphery of flywheel 316 is provided with an integral lining or type of a high friction rubber material for engagement with the pulley 315. The pulley 315 is stepped so as to have a pulley portion 315a of a reduced diameter and a pulley portion 315b of an increased diameter, with the pulley portion 315b located nearer the motor M and the pulley portion 315a located nearer the capstan 306. The pulley portions 315a, 315b are interconnected by a bevelled surface 315c. A coiled tension spring 317 extends between the fixture 312a and a stationary point on the base plate 301 for normally urging the motor holder 312 and hence the motor M in a direction such that the pulley 315 is pulled toward the outer radial extremity of the flywheel 316, thus maintaining the pulley portion 315a of a reduced diameter in abutment against the rubber lining 316a on the flywheel 315. It should be understood that the movement of the motor holder 312 to the right, as viewed in FIG. 40, is limited by the engagement between the slots 313a to 313d and the pins 314a to 314d.

The motor holder 312 is coupled with the operating plate 310 through an interconnecting rod 318, which is pivotally connected at its one end 318a by a pin 319 which is fixedly mounted on the fixture 312a and which has its other end 318b extending below the operating plate 310. At its other end 318b, a connecting pin 320 is fixedly mounted on the rod and extends through a key-shaped opening 321 formed in the operating plate 310. As best shown in FIG. 41, the opening 321 includes an axially extending portion 321a which extends in a direction parallel to the direction of linear movement of the motor M, and a hole portion 321b of a reduced length which extends in a direction at right angles to the axial portion 321a and toward the pinch roller 307. The connecting rod 318 is biased to rock counter-clockwise about the pin 319 by a torsion spring 322 disposed thereon. The resulting rocking movement of the rod 318 is limited by the abutment of the top end of the pin 320 against an actuating edge 323a of a detecting lever 323, whereby the connecting pin 320 is located within the hole portion 321b.

The detecting lever 323 has the function of detecting the presence or absence of a detection opening formed in the sidewall of a tape cassette, and is slidably disposed on the base plate 301 so as to move in the same direction as the motor M. Specifically, the lever 323 is formed with a pair of spaced elongate guide slots 323b, 323c, which are engaged by pins 324a, 324b fixedly mounted on the base plate 301 so as to permit a sliding movement of the lever in a direction parallel to the direction of movement of the motor M. The detecting lever 323 is generally U-shaped, and one limb portion 323d is aligned at right angles to the base thereof so as to extend toward the connecting pin 320. The extremity of the end portion 323d defines the actuating edge 323a, which is notched slantwise at the corner nearer the cassette 302, thereby forming a bevelled edge 323e. The bevelled edge 323e permits the pin 320 to be moved from the hole portion 321b into the axial portion 321a as the detecting lever 323 moves to the right, as viewed in FIG. 40.

The other end portion 323f of the detecting lever 323 is aligned at right angles to the base thereof so as to extend in a direction nearer the cassette 302, and is provided with a detecting piece 323g which is formed by aligning free end of the end portion 323f in a direction toward the rear end face 302c of the cassette 302. A tension spring 325 having a reduced resilience extends between the detecting lever 323 and the base plate 301 to bias lever 323 to move to the right, as viewed in FIG. 40, and the detecting piece 323g functions to detect the presence or absence of a detection opening 302d (see FIG. 43) formed in the rear end face 302c of the cassette 302 under the bias applied by the spring 325.

The operation of the above embodiment will be described below. FIG. 40 illustrates that a cassette having no detection opening 302d is loaded on the tape recorder. In this instance, the rear end face 302c of the cassette is solid in the portion adapted for engagement with the detecting piece as a result of the absence of the detection opening 302d, so that the detecting lever 323 is displaced to the left, as viewed in FIG. 40, against the resilience of the spring 325. As a result, the bevelled edge 323e of the detecting lever 323 is also displaced to the left, pushing up the connecting pin 320, whereby the connecting rod 318 is rocked clockwise about the pin 319 against the resilience of the spring 322, thus maintaining the connecting pin 320 within the hole portion 321b by the abutment between it and the actuating edge 323a.

Figure 42:
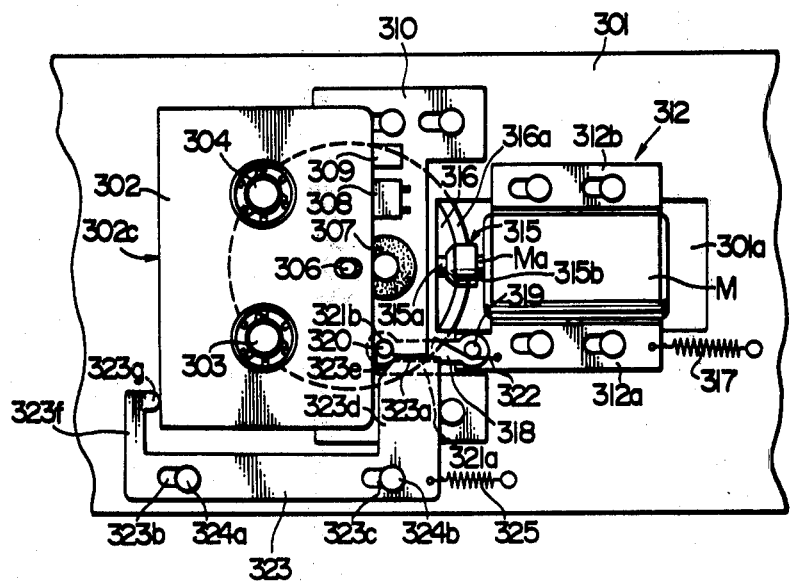

When a record button or associated member is operated to establish a record mode for the tape recorder under this condition, the operating plate 310 is moved in the direction of the arrow a, causing the pinch roller 307 and the heads 308, 309 to advance into the associated openings formed in the loaded cassette 302 for contact with the tape surface, as illustrated in FIG. 42. As the operating plate 310 moves in the direction of the arrow a, the engagement between the hole portion 321b and the connecting pin 320 functions to move the motor holder 312 toward the cassette 302 through the connecting rod 318 on which this pin is fixedly mounted, so that the pulley 315 fixedly mounted on the output shaft Ma of the motor M will be moved closer to the capstan 306. As a consequence, the pulley portion 315a of reduced diameter is disengaged from the rubber lining 316a on the flywheel 316, while the pulley portion 315b of increased diameter engages such lining 316a. This results in an increase in the speed of rotation of the capstan 306 to feed the tape at a higher rate, as a result of the transmission of the drive from the motor M through the pulley portion 315b of increased diameter.

When a tape cassette having the detection opening 302d formed therein for changing the tape speed is loaded on the tape recorder, the detecting piece 323g detects the opening 302d by causing the detecting lever 323 to remain in its right-hand position under the bias of the spring 325, as shown in FIG. 43. In this position of the detecting lever 323, the connecting pin 320 is located to the left of the bevelled edge 323e, so that the bias on the connecting rod 318 causes it to rock counter-clockwise about the pin 319, whereby the pin 320 moves from the hole portion 321b into the axial portion 321a to be located therein. When the record/playback button is operated to move the operating plate 310 in the direction of the arrow a (see FIG. 40) under this condition, the location of the connecting pin 320 within the axial portion 321a which extends in the direction of movement of the operating plate 310 permits only the latter to be moved in the direction of a without accompanying the connecting rod 318, motor holder 312 and motor M. As a result, the pulley 315 maintains its previous position in which the pulley portion 315a of reduced diameter bears against the rubber lining 316a on the flywheel 316, so that the drive from the motor M is transmitted through such portion to the flywheel 316 to rotate the capstan 306 at a lower rate.

FIG. 44 shows another embodiment of the invention in which the tape speed is automatically switched by the use of an idler. It is to be noted that the operating plate 310 which carries the pinch roller 307, record/playback head 308 and erase head 309 as well as the flywheel 316 on which the capstan 306 is mounted are similar in construction and function to those described above in connection with the embodiment shown in FIGS. 40 to 43, and therefore will not be specifically described. Referring to FIG. 44, there is shown an L-shaped detecting layer 331 which is pivotally mounted on a pin 335 which is secured to the base plate 301, the pin 335 being located at the knee of the L-configuration. The lever 331 has an arm 331a which extends along the rear end face 302c of the cassette 302 and is formed with a detecting piece 331b at its free end which is adapted to extend toward the rear end face, generally in a manner similar to the previous embodiment. The lever 331 includes another arm 331c which extends along on lateral side of the cassette 302, and which is formed with an actuating edge 331d on its lateral side located nearer the cassette at a position adjacent to the free end thereof. The actuating edge 331d is engaged by a folded piece 332a of an operating lever 332 so as to maintain the piece 332a in the path of movement of the operating member 310 when the cassette 302 is not provided with the detecting opening 302d (shown in FIG. 46). A torsion spring 333 is disposed on the pin 335 to bias the detecting lever 331 for a clockwise rotation about the pin 335, whereby the detecting piece 331b is enabled to detect the presence or absence of the detection opening in the cassette. When the detection opening 302d is detected, the detecting lever 331 rocks due to the bias of spring 333 until the arm 331c abuts against a stop pin 334.

The operating lever 332 is located to the right of the detecting lever 331, as viewed in FIG. 44, with its lateral side 332b, located nearer the cassette 302, disposed in overlying relationship with the operating plate 310. The lever 332 is formed with a lengthwise elongate guide slot 332c, which is engaged by a pin 336 fixedly mounted on the base plate 301, thus enabling both a rocking motion and a sliding movement of the lever 332 relative to the base plate 301. The right-hand end of the lever 332 fixedly carries a pin 337, and is also engaged by one end of a coiled tension spring 338, the other end of which is secured to the base plate 301. In this manner, the sliding movement of the lever 332 is limited by the abutment of the pin 336 against the edge of the slot 332c.

A coiled tension spring 339 has its one end engaged with the pin 337, and its other end engaged with a U-shaped idler holding plate 340 which is disposed to the right of the operating plate 310, as viewed in FIG. 44, and which is pivotally mounted on a pin 341 fixedly mounted on the base plate 301. The plate 340 includes a pair of arms 340a, 340b which are angularly spaced apart and which extend over a rectangular opening 301b formed in the base plate 301, located intermediate the operating plate 310 and the pin 341. The arm 340a which is located nearer the operating lever 332 carries a shaft 342 which extends downwardly and on which a stepped idler is rotatably mounted. The idler includes a portion 343a of a large diameter and another portion 343b of a small diameter. The larger idler portion 343a is maintained in peripheral engagement with a pulley 345 which is fixedly mounted on the output shaft of a tape drive motor (not shown) to transmit the drive from the motor to the smaller idler portion 343b, which bears against the rubber lining 316a on the flywheel 316, thus transmitting the drive from the motor to the flywheel 316 with a speed reduction.

The other arm 340b of the idler holding plate 340 carries a shaft 344 on its free end, which shaft extends downwardly through the opening 301b, and an idler 346 of a large diameter is rotatably mounted thereon. As the idler holding plate 340 rocks counter-clockwise about the pin 341, the idler 346 moves in a direction toward the space between the pulley 345 and the flywheel 316 into peripheral engagement with these members, thus transmitting the drive from the motor to the flywheel 316 to rotate the capstan at a higher rate.

FIG. 44 shows the position of various parts when a tape cassette 302 having no detection opening 302d is loaded. The absence of the detection opening causes the rear end face 302c of the cassette 302 to urge the detecting piece 331b to the left, whereby the lever 331 rocks counterclockwise about the pin 335 against its own bias. As it rocks, the actuating edge 331d on the other arm 331c bears against the folded piece 332a to move it into the path of movement of the operating plate 310 by clockwise rotating the operating lever 332 about its pivot 336. As the lever 332 rotates clockwise, the idler holding plate 340 also rotates clockwise about its pivot 341, since the point of engagement of the spring 339 therewith is located to the right, as viewed in FIG. 44, of the axis of the pin 341. As a consequence, the larger idler portion 343a is brought into abutment against the pulley 345 while the smaller idler portion 343b is brought into abutment against the flywheel 316, thus transmitting the drive from the motor to the capstan 306.

When the record/playback button (not shown ) is operated under this condition to move the operating plate 310 in the direction of the arrow a in order to establish a record or playback mode, the operating lever 332 is also moved to the left since the folded piece 332a thereon is located in the path of movement of the operating plate 310. Thereupon, the line of action of the spring 339 passes over the axis of the pivot 341 and is now located to the left thereof, so that the plate 340 is rocked counter-clockwise about the pin 341. As it rocks, the stepped idler is disengaged from the pulley 345 and the flywheel 316, which are engaged by the other idler 346 to transmit the drive from the motor to the flywheel 316, thus rotating the capstan 306 at a higher rate.

Figure 46:
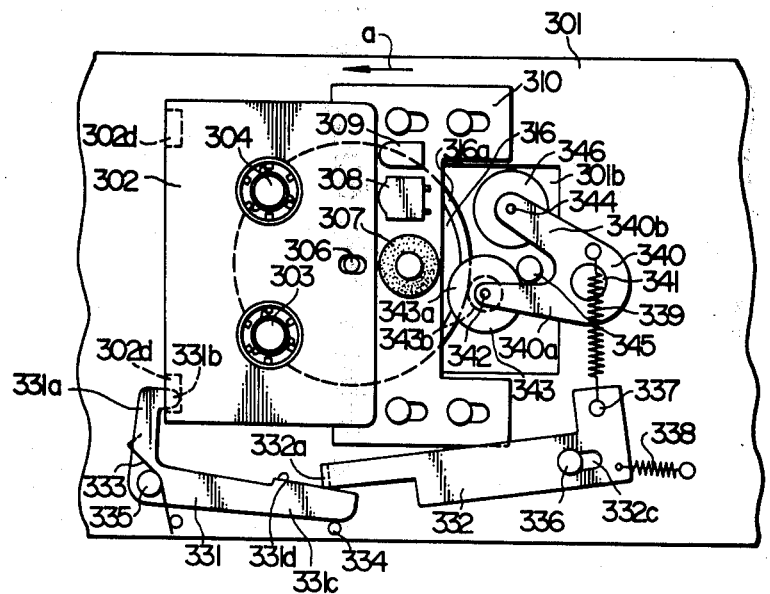

When a tape cassette 302 having the detection opening 302d is loaded on the tape recorder, the detecting piece 331b detects the presence of such opening by allowing the detecting lever 331 to rock clockwise about the pin 335 under the resilience of the spring 333 until the arm 331c bears against the stop pin 334, as illustrated in FIG. 46. As the lever 331 rocks, the tension of the spring 339 pulls the right-hand end of the operating lever 332 toward the idler holding plate 340, whereby the lever 332 is rocked counter-clockwise about the pin 336 until the folded piece 332a bears against the arm 331c. As a consequence, the folded piece 332a is retracted from the path of movement of the operating plate 310, and therefore, when the record or playback button is operated to move the operating plate 310 in the direction of the arrow a to establish a record or playback mode, the plate 310 moves alone without accompanying the operating lever 332. At this time, the line of action of the spring 339 passes to the right of the axis of the pin 341, as shown in FIG. 46, so that the idler holding plate 340 is rocked clockwise about the pin 341 to place the stepped idler between the pulley 345 and the flywheel 316 to rotate the capstan 306 at a lower rate.

It will be understood from the above description that the mechanism for changing the tape speed is displaced to a pre-conditioned position in response to the operation of the detecting member which detects the presence or absence of a detection opening formed in the sidewall of the tape cassette, and subsequently, the mechanism is controlled to provide a desired tape speed as the record/playback button or associated member is operated to its operative position. Thus, a force of a relatively high magnitude which is required to operate the mechanism for changing the tape speed is supplied by the depression of the record/playback button or associated member and hence no excessive force is applied against the sidewall of the cassette which might give rise to a displacement in the position or azimuth of the cassette loaded. It is also to be noted that when a playback mode is established, a movement of the erase head 9 toward the tape surface is blocked by suitable means, not shown.

Figure 45:
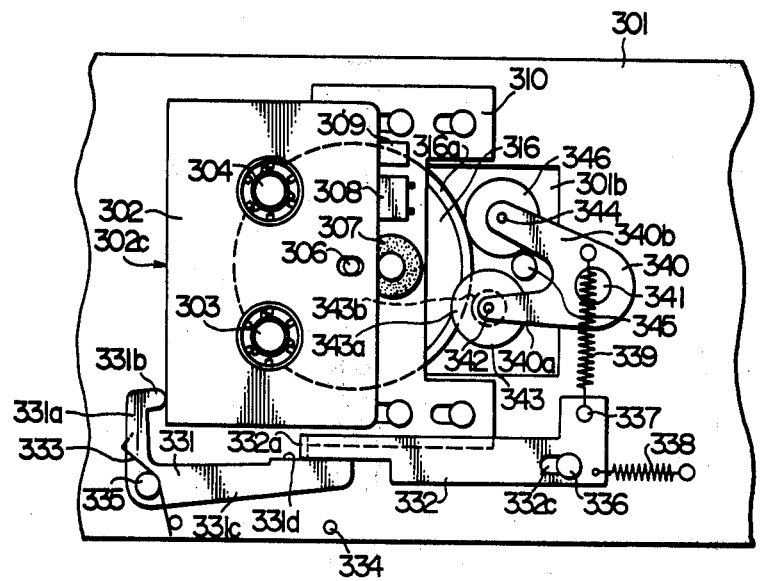
FIGS. 45 and 46 are similar views to FIG. 44 and illustrating the operation thereof.
Figure 47:
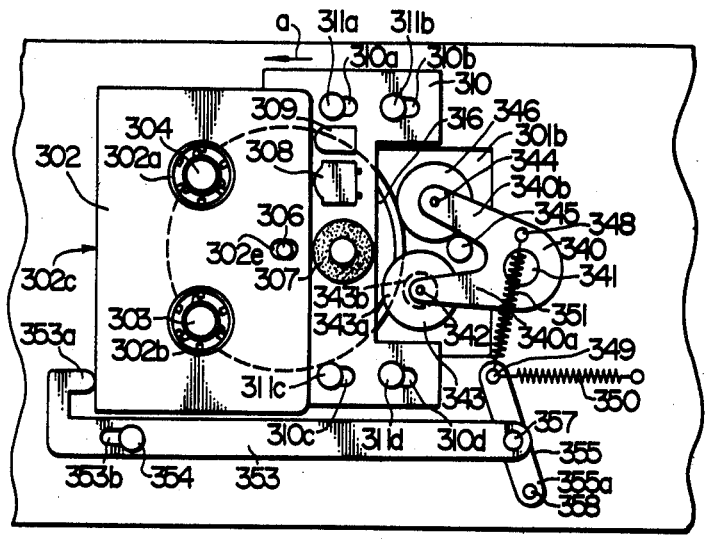
FIG. 47 is a plan view of a modification of the apparatus shown in FIG. 44.
Figure 48:
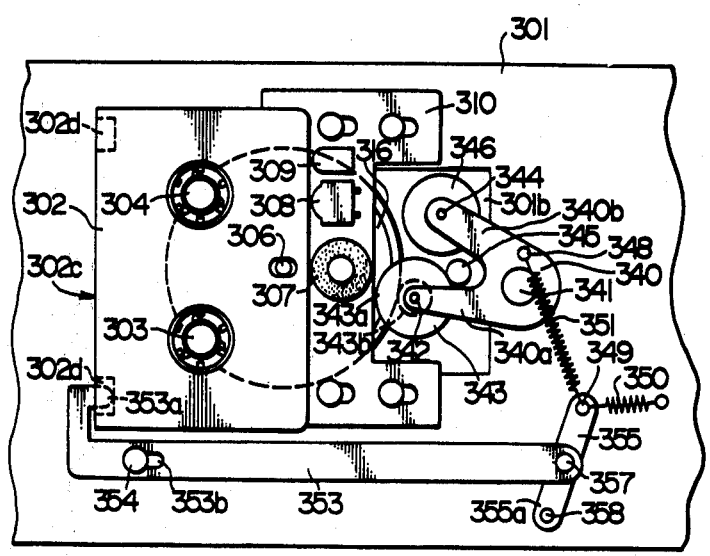
FIG. 48 is a similar view to FIG. 47, showing the operation of the apparatus shown in FIG. 47.

FIGS. 47 and 48 show a further embodiment of the invention which provides a mechanical advantage that the mechanical means for switching the tape speed can be positively operated with sufficient force, independently from the operation of the record/playback button or associated member, while permitting the detection member which detects the presence or absence of a detection opening to be operated with a reduced force. In FIGS. 47 and 48, parts corresponding to those shown in FIGS. 44 to 46 are designated by like reference characters, and hence will not be described specifically. A tape drive motor (not shown) is disposed below the base plate 301, and carries a pulley 345 fixedly mounted on its output shaft, the pulley 345 being located below the rectangular opening 301b formed in the base plate 301 at a position to the right of the operating plate 310, as viewed in FIG. 47. Pulley 345 is adapted to be engaged by speed changing idlers to be described later so as to transmit the drive from the motor to the capstan 306 through the flywheel 316. The flywheel 316 is rotatably disposed below the base plate 301, and has the capstan 306 fixedly mounted thereon in alignment with the axis thereof.

A detecting lever 353 is disposed to extend along the cassette 302 and the operating plate 310 and serves to detect the presence or absence of the detection opening 302d (see FIG. 48) which is formed in the rear end face 302c of the cassette 302 toward its lateral side. As best shown in FIG. 47, the left-hand end of the detecting lever 353 is bent so as to extend along the rear end face 302c of the cassette, and is formed with a detecting piece 353a which is further bent at right angles to this extension so as to extend toward the rear end face 302c. Toward its left-hand end, the lever 353 is formed with an elongate guide slot 353b, which is engaged by a pin 354 fixedly mounted on the base plate 301. The right-hand end of the lever 353 is pivotally connected by pin 357 with an operating lever 355, which is in turn pivotally mounted at its end 355a on a pin 358 secured to the base plate 301 and extends in a direction generally perpendicular to the length of the lever 353. It will be noted that the right-hand end of the lever 353 is connected with the lever 355 at approximately the middle position thereof. The free end of the operating lever 355 fixedly carries a pin 349, which is engaged by one end of a coiled tension spring 350, the other end of which is secured to the base plate 301, whereby the operating lever 355 is biased for a clockwise rotation about the pin 358. As a result, the detecting lever 353 is also biased for a sliding movement to the right, as viewed in FIG. 47.

The operating lever 355 is also connected with the idler holding plate 340 by an idler switching spring 351 which is constituted by a coiled tension spring extending between the pin 349 and the pin 348 secured to plate 340. As in the previous embodiment, the idler holding plate 340 is U-shaped and is pivotally mounted on a pin 341 fixedly mounted on the base plate 301 at a position to the right of the operating plate 310, as viewed in FIG. 47. As before, the plate 340 is formed with the pair of arms 340a, 340b which extend to locations over the rectangular opening 301b formed in the base plate 301 which is located intermediate the operating plate 310 and the pin 341. The shaft 342 depends downwardly from the free end of the arm 340a and rotatably carries a stepped idler including the idler portion 343a of a large diameter and the idler portion 343b of a small diameter. The idler portion 343a is adapted to engage the pulley 345 previously mentioned, which is fixedly mounted on the output shaft of a tape drive motor (not shown) while the idler portion 343b engages the flywheel 316, thus transmitting the drive from the motor thereto with a speed reduction.

Again the shaft 344 depends downwardly from the free end of the arm 340b into the opening 301b, and rotatably carries the idler 346 of an increased diameter. As the plate 340 rocks counter-clockwise about the pin 341, the idler 346 is brought into engagement with the pulley 345 and the flywheel 316, respectively, to transmit the drive from the motor to the latter, causing the capstan 306 to rotate at a higher rate. When a cassette having no detection opening 302d (the opening being shown in FIG. 48) is loaded on the tape recorder, as shown in FIG. 47, the solid rear end face 302c of the cassette 302 urges the detecting piece 353a to the left, thus causing the detecting lever 353 to slide to the left. As it slides, the operating lever 355 which is connected with the right-hand end thereof is forced to rock counter-clockwise about the pin 358, whereby the spring 351 has its line of action shifted to the left-hand side of the axis of the pin 341. Thereupon, the plate 340 is rocked counter-clockwise about the pin 341, bringing the idler 346 into engagement with the pulley 345 and the flywheel 316. Therefore, the capstan 306 and hence the magnetic tape is driven at a higher rate.

When a tape cassette having the detection opening 302d is loaded on the tape recorder (FIG. 48), the detecting piece 353a detects the presence of this opening by causing the detecting lever 353 to slide to the right under the bias of the coiled spring 350. As it slides, the operating lever 355 is rocked clockwise about the pin 358, whereby the line of action of the spring 351 is shifted to the right-hand side of the axis of the pin 341. Thereupon, the plate 340 is forced to rotate clockwise about the pin 341, bringing the stepped idler 343a, 343b into engagement with the pulley 345 and the flywheel 316. Thus, the rotation of the output shaft of the motor is reduced by the stepped idler before being transmitted to the capstan 306, which is therefore automatically changed to a lower rate as is the tape speed.

As used in the following claims, the term "tape head" shall refer to the record and/or playback head of the tape recorder.

What is claimed is:

1. An automatic switching device for use in a cassette tape recorder adapted to receive a tape cassette and including a tape head, the switching device comprising:
    tape erasure prevention means including means for detecting the removal of a lug covering an erasure prevention aperture in said tape cassette;
    first means for detecting the presence or absence of a first aperture in said tape cassette, the presence or absence of said first aperture being representative of the relative coercivity of the magnetic tape housed by said cassette;
    second means for detecting the presence or absence of a second aperture in said tape cassette, the presence or absence of said second aperture being representative of a desired running speed;
    third means responsive to said first means for controlling the biasing current to said tape head in accordance with the coercivity of the tape housed in said tape cassette as indicated by the presence or absence of said first aperture; and
    fourth means responsive to said first and second means for compensating for low frequency signals recorded on said tape cassette when the presence or absence of said first and second apertures indicates that such compensation is desirable.

2. An automatic switching device as in claim 1, wherein said third means applies a first biasing current to said tape head when the coercivity of said tape head as indicated by the presence or absence of said first aperture is at a first value and wherein said third means further applies a second higher biasing current to said tape head when the coercivity of said tape as indicated by the presence or absence of said first aperture is at a second higher value.

3. An automatic switching device as in claim 2, wherein said fourth means does not compensate for low frequency signals passing through said tape head when the desired running speed of said tape as indicated by the presence or absence of said second aperture is at a first value and wherein said fourth means compensates for low frequency signals passing through said tape head when a desired running speed of said tape as indicated by the presence or absence of said second aperture is at a second, higher value and the relative coercivity of said tape as indicated by the presence or absence of said first aperture is at the higher of two possible coercivity values.

4. An automatic switching device as in claim 2, wherein said third means includes a switch which selectively inserts a resistive means into a biasing circuit as a function of the presence or absence of said first aperture such that said biasing circuit applies a biasing current of a first magnitude to said tape head when said switch inserts said resistive means into said circuit and applies a biasing current of a second magnitude to said tape head when said switch does not insert said resistive means into said biasing circuit.

5. An automatic switching device in accordance with claim 4, wherein said first means includes a mechanical linkage, a first end of said mechanical linkage adapted to contact said tape cassette to detect the presence or absence of said first aperture, a second end of said linkage adapted to open and close said switch in accordance with the presence or absence of said first aperture.

6. An automatic switching device as in claim 5, wherein said fourth means includes a second switch which selectively inserts a low frequency compensation circuit into the sound reproducing circuit of said cassette tape recorder.

7. An automatic switching device as in claim 6, wherein said second means comprises a second mechanical linkage, a first end of said second linkage adapted to contact said tape cassette to detect the presence or absence of said second aperture, a second end of said first and second linkages adapted to close or open said second switch in accordance with the presence or absence of both of said first and second apertures.

8. An automatic switching device as in claim 7, wherein said first and second linkages cooperate to close said second switch whenever the presence or absence of said first aperture indicates that the coercivity of said tape is relatively high and the presence or absence of said second aperture indicates that the desired running speed is relatively high.

9. Apparatus in accordance with claim 1 further including fifth means responsive to said second means for controlling the current to a motor driving said tape cassette in accordance with the desired tape running speed as indicated by the presence or absence of said second aperture.

10. Apparatus as in claim 9, wherein said fifth means includes a two-position switch, said fifth means supplying a first current to said motor when said switch is in a first position and a second higher current to said motor when said switch is in a second position.

11. Apparatus as in claim 10, wherein said fifth means further includes a mechanical linkage, a first end of said mechanical linkage adapted to contact said tape cassette to detect the presence or absence of said second aperture, a second end of said linkage adapted to close or open said switch in accordance with the presence or absence of said second aperture.

12. Apparatus as in claim 11, including means for moving said first end of said linkage between a first position wherein it does not interfere with the insertion of said tape cassette into said cassette recorder and a second position wherein said first end of said linkage is adapted to detect the presence or absence of said second aperture, said moving means moving said first end of said linkage in to said second position when said tape recorder is placed in either of a playback or record mode.

13. Apparatus as in claim 12, wherein said moving means moves said linkage first end between said first and said second positions in response to the movement of a record/playback button.

* * * * *